(12) United States Patent
Zeiler et al.

(10) Patent No.: US 11,890,944 B2
(45) Date of Patent: *Feb. 6, 2024

(54) LITHIUM-ION BATTERY FOR ENGINE STARTING

(71) Applicant: Briggs & Stratton, LLC, Wauwatosa, WI (US)

(72) Inventors: Jeffrey M. Zeiler, Wauwatosa, WI (US); Richard J. Gilpatrick, Whitewater, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/752,787

(22) Filed: May 24, 2022

(65) Prior Publication Data

US 2022/0285960 A1    Sep. 8, 2022

Related U.S. Application Data

(63) Continuation of application No. 15/555,323, filed as application No. PCT/US2016/020707 on Mar. 3, 2016, now Pat. No. 11,349,323.

(Continued)

(51) Int. Cl.
*F02N 11/08* (2006.01)
*H02J 7/00* (2006.01)
(Continued)

(52) U.S. Cl.
CPC .......... *B60L 1/003* (2013.01); *A01D 34/6818* (2013.01); *B60L 58/10* (2019.02);
(Continued)

(58) Field of Classification Search
CPC .... F02N 11/0862; H02J 7/0029; H02J 7/0068
See application file for complete search history.

(56) References Cited

U.S. PATENT DOCUMENTS

| 4,870,811 A | 10/1989 | Steele |
| 6,222,343 B1 | 4/2001 | Crisp et al. |

(Continued)

FOREIGN PATENT DOCUMENTS

GB    2 442 345 A    4/2008

OTHER PUBLICATIONS

International Search Report and Written Opinion, PCT/US2016/020707, Briggs & Stratton Corporation, 16 pages (dated Jun. 17, 2016).

*Primary Examiner* — Tulsidas C Patel
*Assistant Examiner* — Thomas K Quigley
(74) *Attorney, Agent, or Firm* — Foley & Lardner LLP

(57) ABSTRACT

A starter battery system for an air cooled engine rated at less than 50 horsepower. The system includes four lithium iron phosphate cells and a charging circuit configured to be powered by rotation of an air cooled engine. A voltage developed by the charging circuit is applied to the four lithium iron phosphate cells without battery management circuitry provided between the charging circuitry and the four lithium iron phosphate cells.

An engine which includes at least one piston, a rotatable crankshaft coupled to the at least one piston, a starter motor configured to selectively initiate rotation of the crankshaft, a lithium-ion battery in electrical communication with the starter motor, the lithium-ion battery having at least one cell, and a charging system configured to be powered by motion of at least one component of the engine. The charging system is configured to continuously apply a voltage potential to the at least one cell while the engine is in a running condition.

An engine including at least one piston, a rotatable crankshaft coupled to the at least one piston, a starter motor configured to selectively initiate rotation of the crankshaft, (Continued)

a lithium-ion battery in electrical communication with the starter motor, the lithium-ion battery having four lithium iron phosphate cells, and a charging system configured to be powered by the engine. The charging system is electrically coupled to the lithium-ion battery and configured to charge the lithium-ion battery and no battery management circuitry is provided between the charging system and the lithium-ion battery.

14 Claims, 16 Drawing Sheets

Related U.S. Application Data

(60) Provisional application No. 62/129,627, filed on Mar. 6, 2015.

(51) Int. Cl.
   *B60L 1/00* (2006.01)
   *B60W 10/26* (2006.01)
   *B60L 58/10* (2019.01)
   *A01D 34/68* (2006.01)
   *H01M 4/58* (2010.01)
   *H01M 10/0525* (2010.01)
   *H01M 10/46* (2006.01)
   *A01D 101/00* (2006.01)

(52) U.S. Cl.
   CPC ......... *B60W 10/26* (2013.01); *F02N 11/0862* (2013.01); *H01M 4/5825* (2013.01); *H01M 10/0525* (2013.01); *H01M 10/46* (2013.01); *H02J 7/0029* (2013.01); *H02J 7/0068* (2013.01); *H02J 7/00302* (2020.01); *A01D 2101/00* (2013.01); *Y02T 10/70* (2013.01); *Y02T 90/16* (2013.01)

(56) References Cited

U.S. PATENT DOCUMENTS

| | | | |
|---|---|---|---|
| 6,456,035 B1 | 9/2002 | Crisp et al. | |
| 6,750,556 B2 * | 6/2004 | Sodemann | F02B 63/04 |
| | | | 123/3 |
| 7,309,938 B1 | 12/2007 | Smith | |
| 7,687,926 B2 | 3/2010 | Grant et al. | |
| 7,781,902 B2 * | 8/2010 | Cerney | F02D 29/06 |
| | | | 290/1 A |
| 7,782,626 B2 | 8/2010 | Buck et al. | |
| 7,989,969 B2 | 8/2011 | Grant et al. | |
| 8,857,138 B2 | 10/2014 | Hansen et al. | |
| 8,935,995 B1 * | 1/2015 | Hawkins | F02B 63/048 |
| | | | 123/3 |
| 9,328,712 B2 * | 5/2016 | Kawagoe | F02P 23/04 |
| 10,181,590 B2 * | 1/2019 | Zeiler | H01M 50/244 |
| 2004/0184971 A1 * | 9/2004 | Fan | B01D 46/528 |
| | | | 422/177 |
| 2006/0196481 A1 * | 9/2006 | Mills | F02M 25/089 |
| | | | 123/519 |
| 2006/0254641 A1 * | 11/2006 | Callahan | A01D 34/82 |
| | | | 137/43 |
| 2007/0182158 A1 * | 8/2007 | Cerney | F02D 29/06 |
| | | | 290/40 C |
| 2008/0079264 A1 | 4/2008 | Serdynski et al. | |
| 2009/0278509 A1 | 11/2009 | Boyles et al. | |
| 2009/0284022 A1 | 11/2009 | Usselman et al. | |
| 2010/0258099 A1 | 10/2010 | Andersson et al. | |
| 2012/0124955 A1 * | 5/2012 | Klika | F04B 17/05 |
| | | | 56/17.3 |
| 2013/0111864 A1 | 5/2013 | Hansen et al. | |
| 2013/0241498 A1 | 9/2013 | Koebler | |
| 2014/0299089 A1 | 10/2014 | Koenen et al. | |
| 2014/0318488 A1 * | 10/2014 | Kawagoe | F02P 7/067 |
| | | | 123/143 B |
| 2015/0318521 A1 * | 11/2015 | Zeiler | H01M 50/244 |
| | | | 429/96 |
| 2019/0200628 A1 * | 7/2019 | Riggen | A23B 4/052 |

* cited by examiner

LITHIUM-ION BATTERY FOR ENGINE STARTING

CROSS-REFERENCE TO RELATED APPLICATIONS

This application is a continuation of U.S. application Ser. No. 15/555,323, filed on Sep. 1, 2017 which claims priority to PCT Application No. PCT/US2016/020707, filed Mar. 3, 2016 which claim the benefit of U.S. Provisional Application No. 62/129,627, filed Mar. 6, 2015, all of which are hereby incorporated by reference in their entireties.

BACKGROUND

The present invention generally relates to internal combustion engines including electric starting systems, outdoor power equipment powered by such engines, vehicles powered by such engines, and other engine driven equipment. More specifically, the present invention relates to internal combustion engines including electric starting systems powered by a rechargeable lithium-ion battery.

Outdoor power equipment includes lawn mowers, riding tractors, snow throwers, pressure washers, portable generators, tillers, log splitters, zero-turn radius mowers, walk-behind mowers, riding mowers, industrial vehicles such as forklifts, utility vehicles, etc. Outdoor power equipment may, for example, use an internal combustion engine to drive an implement, such as a rotary blade of a lawn mower, a pump of a pressure washer, the auger of a snowthrower, the alternator of a generator, and/or a drivetrain of the outdoor power equipment. Vehicles include cars, trucks, automobiles, motorcycles, scooters, boats, all-terrain vehicles (ATVs), personal water craft, snowmobiles, utility vehicles (UTVs), and the like. Outdoor power equipment, vehicles, engine driven equipment, engines and other engine related applications are collectively referred to as "equipment."

Equipment may include an electric starting system in which a starter motor powered by a battery starts the engine. Typically, such electric starting systems also include a user-actuated starter switch (e.g., a pushbutton or key switch) and a starter solenoid. The starter solenoid is the connection between a low current circuit including the starter switch and a high current circuit including the starter motor. To start the engine, the user actuates the starter switch, causing the starter solenoid to close so that the battery provides starting current to the starting motor to start the engine.

In typical applications, the battery is lead-acid battery. Lead-acid batteries are filled with a liquid electrolyte, typically a mixture of water and sulfuric acid. The electrolyte is corrosive. Lead-acid batteries are temperature sensitive, which may result in the engine having difficulty starting or not starting at all in cold weather. Also, a lead-acid battery will run down with the passage of time and not be able to provide power (i.e., lose charge or become completely discharged—lead acid batteries may lose approximately 1 percent of charge capacity per day). A lead-acid battery may need to be replaced seasonally, removed from the outdoor power equipment and stored inside, or otherwise maintained or serviced by a user. Infrequent/intermittent use further exacerbates problems inherent to lead-acid batteries. Certain applications (such as outdoor power equipment) that are subjected to extreme temperatures and/or infrequent/intermittent use may cause premature failure of lead-acid batteries.

Alternatively, lithium-ion batteries may be used instead of lead-acid batteries. Lithium-ion batteries, particularly oxide-based batteries such as $LiCoO_2$ batteries, typically are used in applications where they must provide continuous energy output over a relatively long time frame (e.g., to power a laptop computer or to power a power tool). However, lithium-ion batteries typically require sophisticated electronics to control and oversee the charging and discharging of the battery cells. For example, a battery management system with complex circuitry may be required in order to regulate the currents and/or voltages involved in the charging and discharging processes in order to ensure that the battery cells are not damaged or otherwise brought to problematic charge states. A battery management system may be included within the battery and may block an electrical signal from being delivered to the cells of a battery, or may block a current being drawn from the cells of a battery based the current and voltage properties of the signal and/or of the battery.

Nevertheless, the expensive and complex battery management system is necessary in most applications of lithium-ion batteries, such as with power tools that draw continuous energy over a relatively long time frame, or with laptop computer batteries, which must endure relatively long charge and discharge cycles. Additionally, in such cases, when charging the lithium-ion battery may be exposed to charge sources with voltages greater than the overvoltage threshold for the battery, resulting in degradation. Also, the lithium-ion battery may be tasked with providing energy for such long time frames that the battery could be discharged past the point of being rechargeable (i.e., past a discharge threshold) if no protection circuitry were in place.

Existing lithium-ion charging schemes typically include a constant current/constant voltage (CC/CV) charging scheme. In the constant current phase, the charging source applies a constant current to the battery, while the voltage increases, up to the maximum voltage threshold for the battery. In the constant voltage phase, the charging source applies the maximum voltage threshold to the battery, while the current is reduced towards zero, until a minimum current threshold is reached (e.g., 3% of the initial constant current/capacity charge rate, etc.).

SUMMARY

One embodiment of the invention relates to a starter battery system for an air cooled engine rated at less than 50 horsepower. The system includes four lithium iron phosphate cells and a charging circuit configured to be powered by rotation of an air cooled engine. A voltage developed by the charging circuit is applied to the four lithium iron phosphate cells without battery management circuitry provided between the charging circuitry and the four lithium iron phosphate cells.

Another embodiment of the invention relates to an engine. The engine includes at least one piston, a rotatable crankshaft coupled to the at least one piston, a starter motor configured to selectively initiate rotation of the crankshaft, a lithium-ion battery in electrical communication with the starter motor, the lithium-ion battery having at least one cell, and a charging system configured to be powered by motion of at least one component of the engine. The charging system is configured to continuously apply a voltage potential to the at least one cell while the engine is in a running condition.

Another embodiment of the invention relates to an engine. The engine includes at least one piston, a rotatable crankshaft coupled to the at least one piston, a starter motor configured to selectively initiate rotation of the crankshaft, a lithium-ion battery in electrical communication with the starter motor, the lithium-ion battery having four lithium iron phosphate cells, and a charging system configured to be powered by the engine. The charging system is electrically coupled to the lithium-ion battery and configured to charge the lithium-ion battery and no battery management circuitry is provided between the charging system and the lithium-ion battery.

DETAILED DESCRIPTION

Figure 1A:
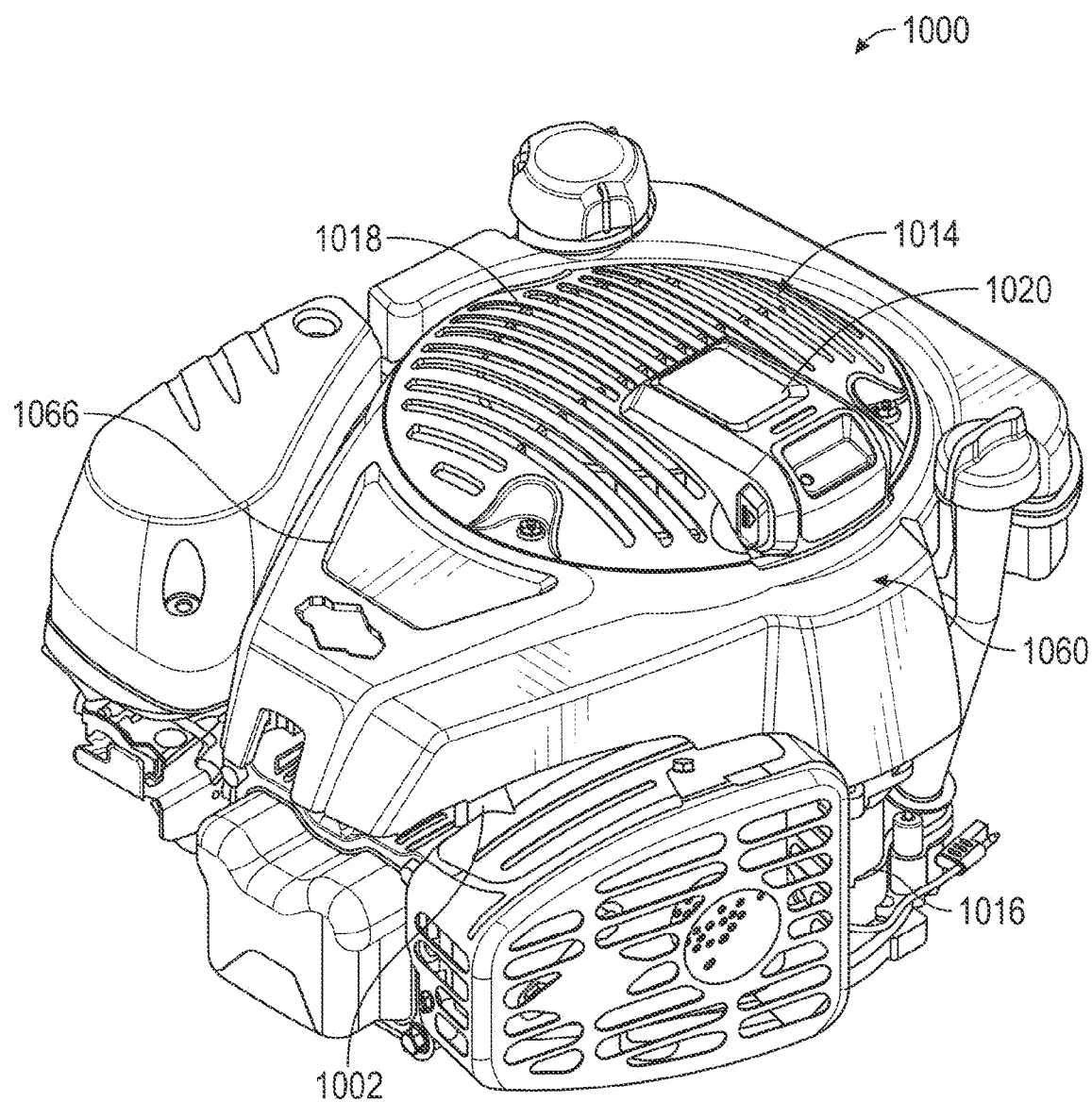
FIG. 1A is a perspective view of an internal combustion engine including an electric starting system powered by a lithium-ion battery, according to an exemplary embodiment of the invention.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

In one embodiment, an internal combustion engine includes an electric starting system powered by a rechargeable $LiFePO_4$ (LFP) battery. The LFP battery provides significant power density. This facilitates starting an internal combustion engine in a variety of applications, such as outdoor power equipment, which frequently have high thresholds for the power required for starting. The LFP battery may be used advantageously with outdoor power equipment that has beneficial charging requirements and schemes. In various embodiments, outdoor power equipment may have a charging system providing an optimized charging voltage potential below the overcharge threshold of the LFP battery, eliminating the need for complex battery management systems found in systems using lithium ion batteries. For example, in some embodiments, an LFP battery may include four cells with a 3.2 volt full potential, a 12.8 volt full pack potential, a 14.4 volt maximum full pack potential, and a 16 volt full pack overcharge threshold; the outdoor power equipment may have a charging system potential of 14 volts, such that the charging system can never overcharge the battery (i.e., the 14 volts supplied by the charging system is less than the 14.40 volt maximum full pack potential and the 16 volt full pack overcharge threshold). Also, the difference between the 14 volt charging system potential and the 14.4 volt maximum full pack potential results in only a small amount of lost or un-used battery capacity (i.e., 0.4 volts). An LFP battery may have a very low self-discharge rate (e.g., an LFP battery may lose very little charge over time when not in use, particularly as compared to lead-acid batteries, which may lose 1 percent of charge capacity a day when not in use). An LFP battery may have a lifespan of several thousand cycles.

In various embodiments, the LFP battery is made of cells with a discharge threshold potential low enough such that when used in combination with outdoor power equipment, the outdoor power equipment may never draw enough current from the battery for the resulting voltage of the battery to be less than the discharge threshold potential of the battery. For example, in some embodiments, the LFP battery may include four cells with a 2.0 volt discharge threshold potential, and an 8.0 volt full pack discharge threshold potential. The outdoor power equipment may never draw enough current from the LFP battery for the resulting voltage of the LFP battery (or any cell therein) to be less than the discharge threshold potential. For example, an LFP battery may be tasked with delivering a startup pulse of 200 amps at 12.8 volts for 10 milliseconds, totaling 25.6 Joules of energy output. The 25.6 Joules energy output is fractional relative to the total energy capacity of the LFP battery (e.g., an LFP battery having a specific energy of 320-400 Joules/gram); therefore, each startup pulse does not significantly decrease the energy stored in the battery, and even numerous startup pulses will not cause the LFP battery to discharge (or the voltage of the battery following a startup pulse to be less than the discharge threshold potential). In various embodiments, the size of the LFP battery is configured such that the LFP battery may deliver startup pulses having various current and time profiles (e.g. currents greater than/less than 200 amps, times greater than/less than 10 milliseconds, etc.).

In some embodiments, a portion of the battery's capacity is deliberately un-used (i.e., the battery is not charged to its maximum full pack potential). Such a method of use would be discouraged in many conventional lithium-ion applications, particularly in applications such as with power tools where continuous energy is demanded over relatively long time scales and charging the battery to its full potential extends the amount (time) of battery use available to the user. According to various embodiments, however, the battery is configured for use with systems such as outdoor power equipment that demand high charge outputs infrequently/intermittently, such that any loss of capacity is mitigated at least by low total energy required for starting and the low amount of time that starting energy is needed and that the battery can then be recharged while the outdoor power equipment is running (i.e., by an onboard charging system) or charged between uses by another energy source.

Figure 1B:
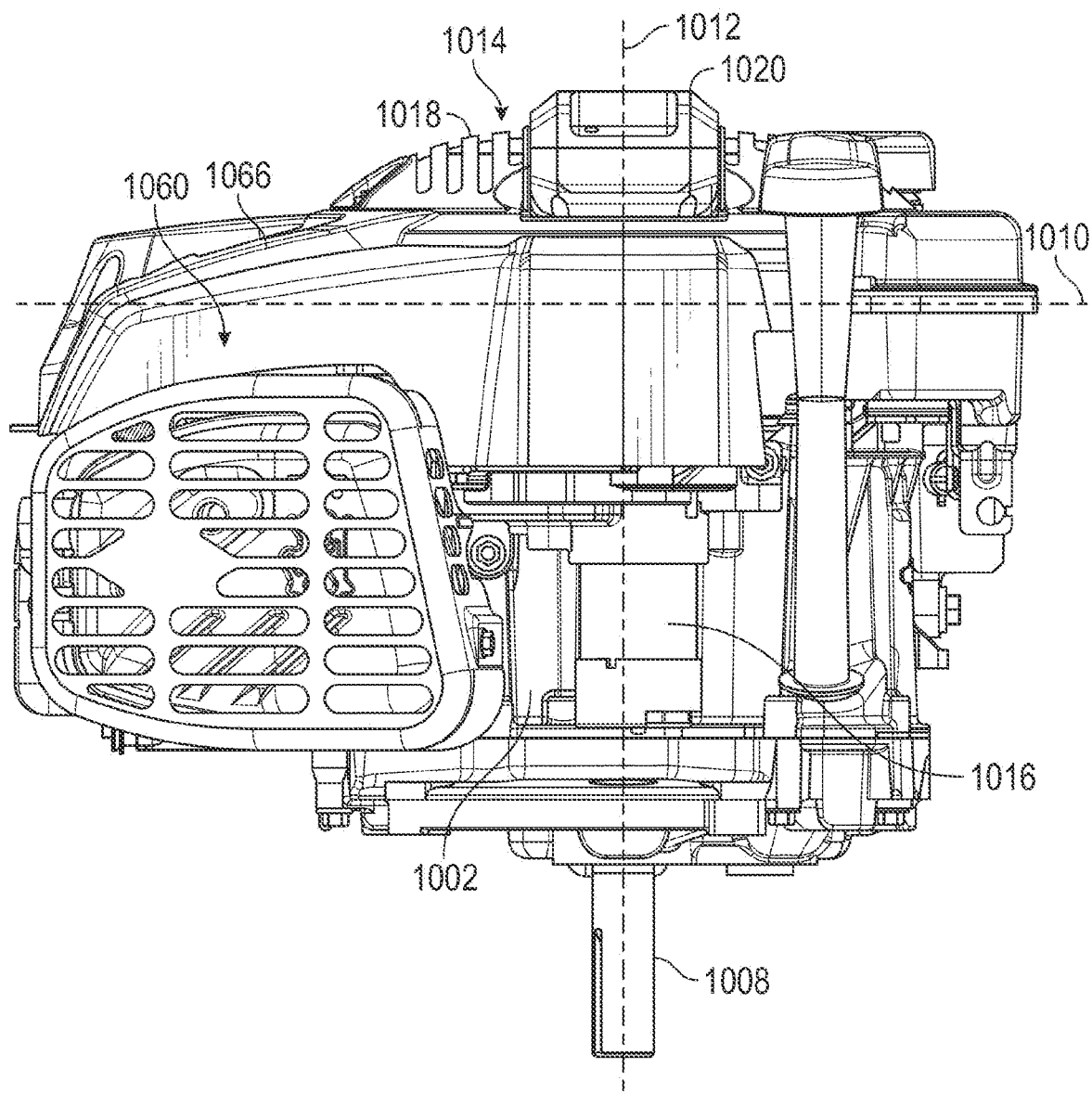
FIG. 1B is a right-side view of the engine of FIG. 1A.
Figure 2:
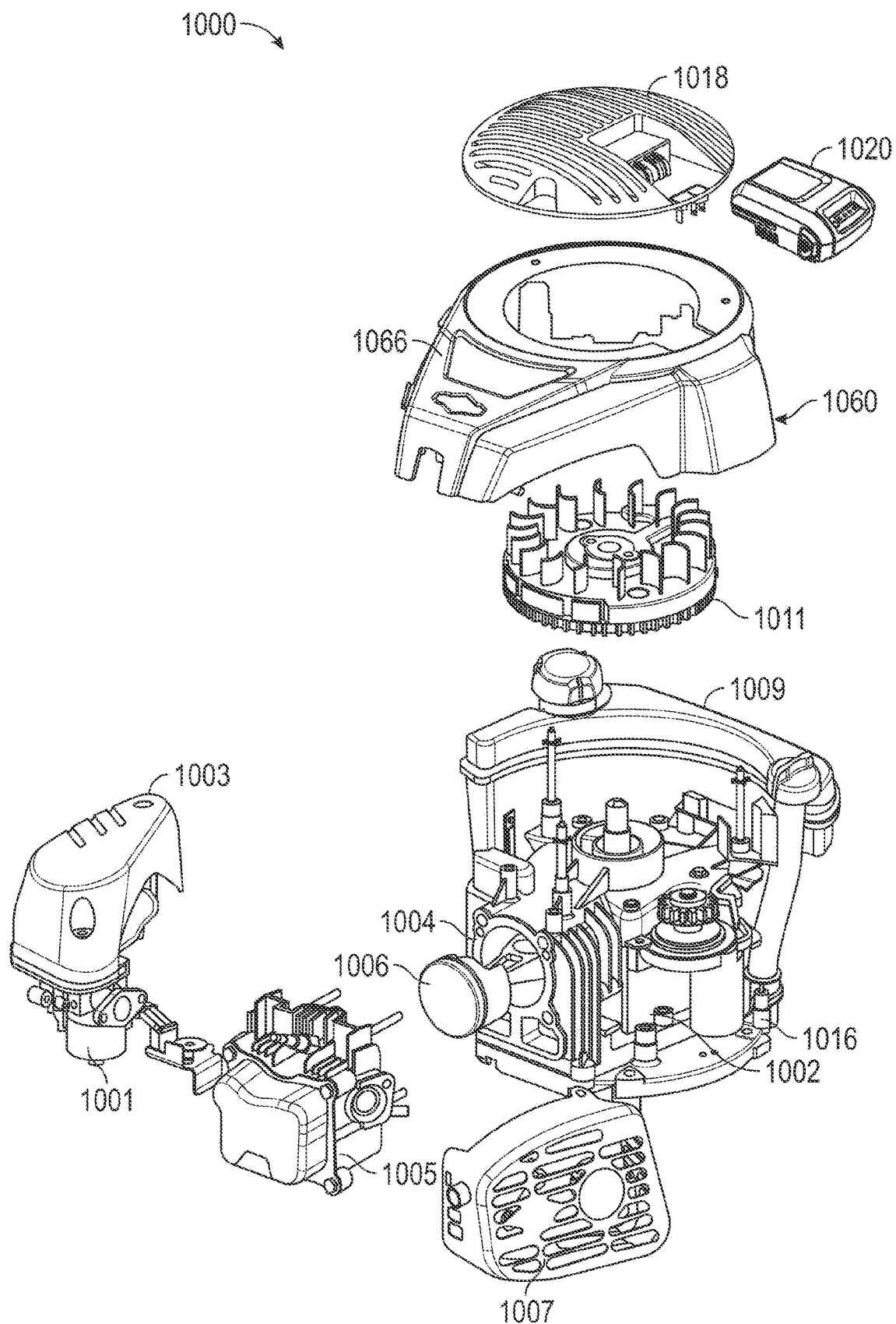
FIG. 2 is an exploded view of the engine of FIG. 1A.
Figure 3A:
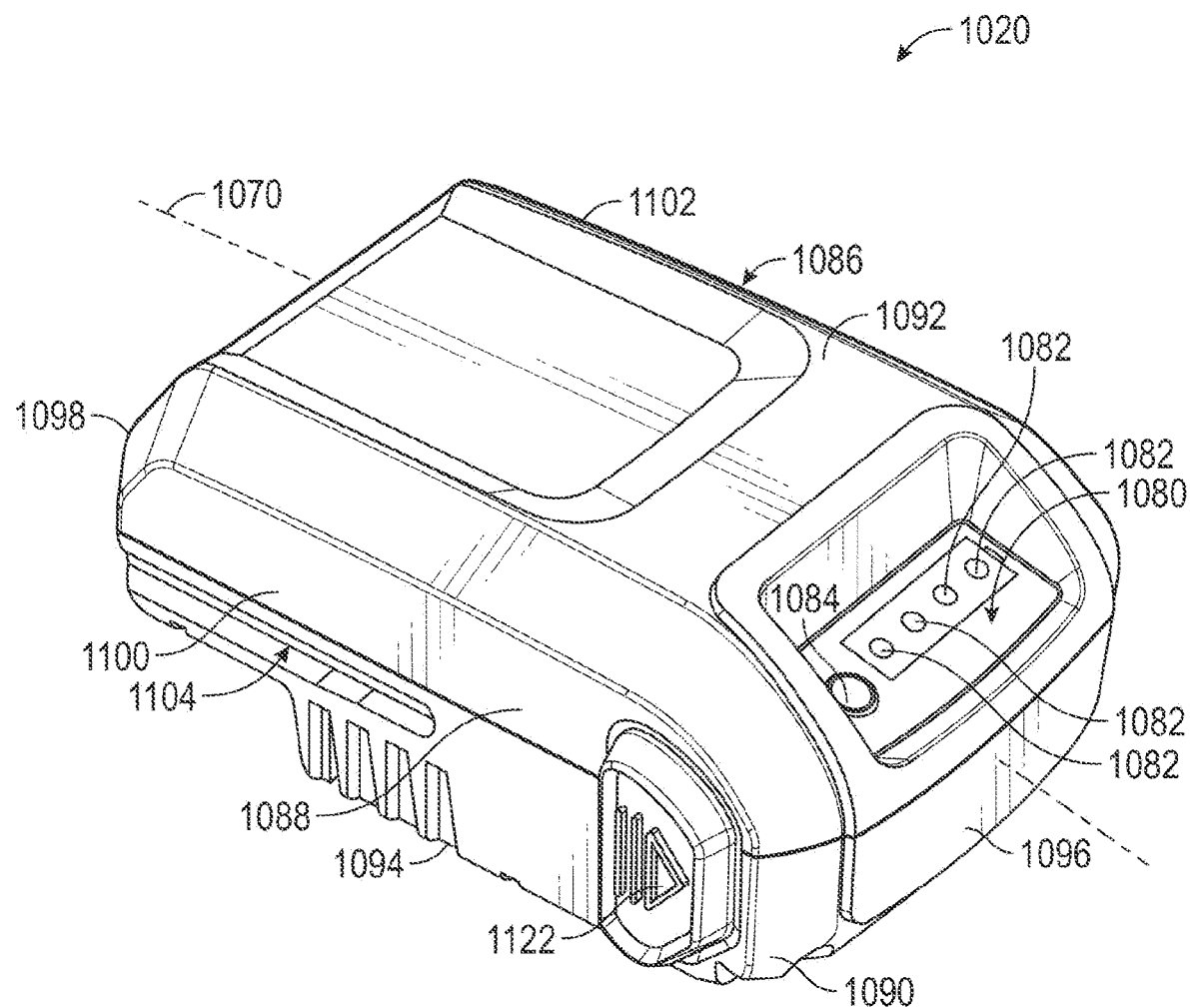
FIG. 3A is a perspective view of a lithium-ion battery for use with an electric starting system of an internal combustion engine, according to an exemplary embodiment of the invention.
Figure 3B:
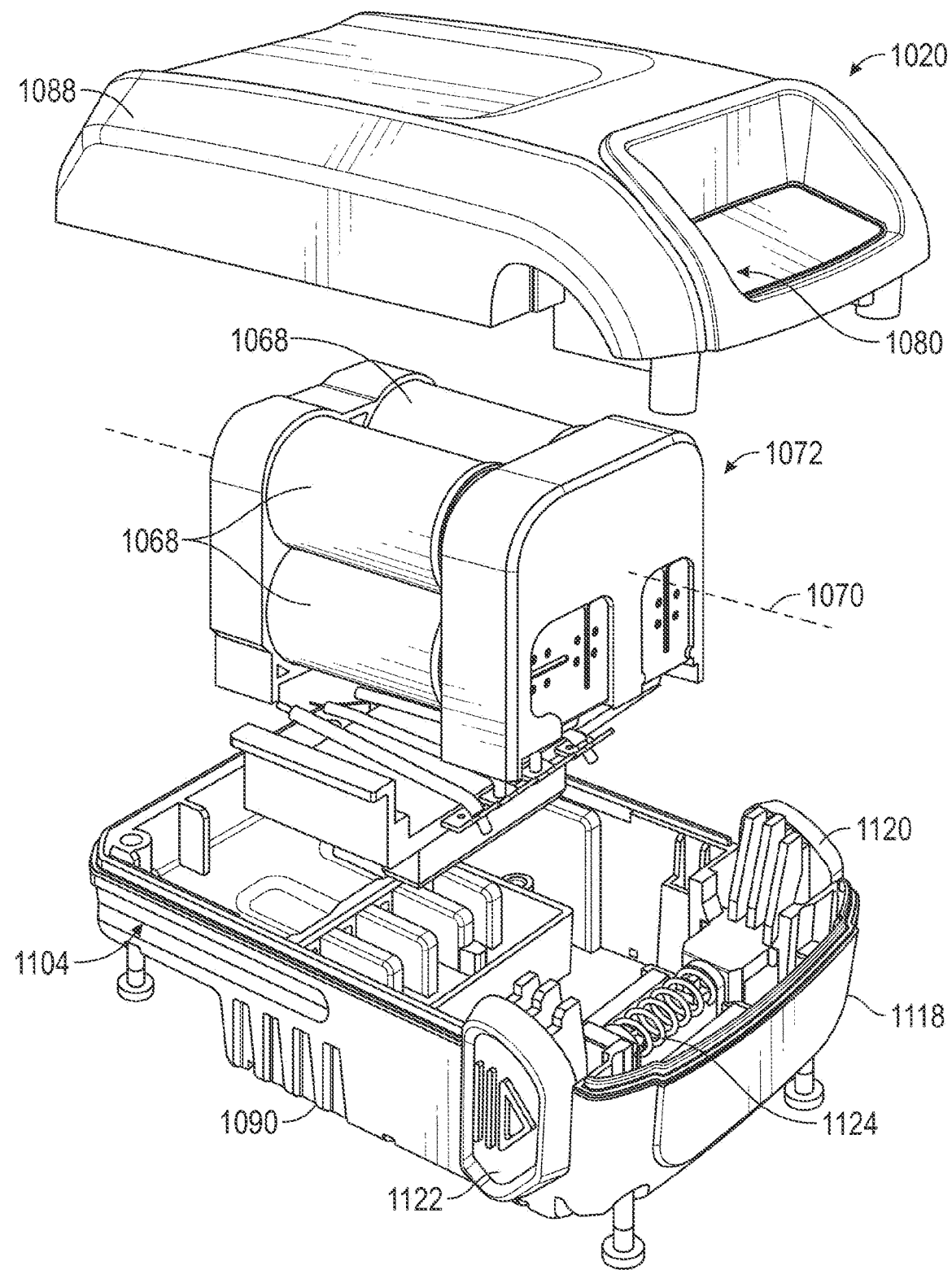
FIG. 3B is an exploded view of a lithium-ion battery, according to an exemplary embodiment of the invention.

Referring to FIGS. 1A, 1B, and 2, an internal combustion engine 1000 is illustrated according to an exemplary embodiment. The engine 1000 includes an engine block 1002 having a cylinder 1004, a piston 1006, and a crankshaft 1008. The piston 1006 reciprocates in the cylinder 1004 along a cylinder axis 1010 to drive the crankshaft 1008. The crankshaft 1008 rotates about a crankshaft axis 1012. As shown in FIG. 2, the engine 1000 includes a fuel system 1001 for supplying an air-fuel mixture to the cylinder 1004 (e.g., a carburetor, an electronic fuel injection system, etc.), an air filter assembly, a cylinder head assembly 1005, a muffler assembly 1007, a fuel tank assembly 1009, and a flywheel and fan assembly 1011. In some embodiments, the engine includes multiple cylinders, for example, a two cylinder engine arranged in a V-twin configuration.

The engine 1000 also includes an electric starting system 1014. The electric starting system 1014 includes a starter motor 1016, a battery receiver 1018, and a rechargeable lithium-ion battery 1020. The starter motor 1016 is electrically coupled to the lithium-ion battery 1020 to be powered by the lithium-ion battery 1020. When activated in response to a user input (e.g., via a key switch, a push button, a bail start system, a trigger start system for a pressure washer, other automatic start system, etc.), the starter motor 1016 rotates the crankshaft to start the engine. The starter motor 1016 is selectively coupled to the crankshaft 1008 (e.g., by a movable pinion gear that selectively engages a flywheel ring gear) so that the starter motor 1016 may be decoupled from the crankshaft (i.e., does not rotate with the crankshaft 1008 after the engine 1000 has been successfully started). As illustrated, the starter motor 1016 is attached to the engine block 1002. As illustrated the battery receiver 1018 and the battery 1020 are as component of the engine 1000. In other embodiments, the battery receiver 1018 and the battery 1020 can located remotely from the engine (e.g., at a dashboard of a tractor, near the hand controls of a snowthrower, etc.). In other embodiments, the rechargeable lithium-ion battery is not configured to be removable without the use of tools and functions as a stand-alone component (i.e., does not require a separate battery receiver). For example, the rechargeable lithium-ion battery could be a component of the engine, a component of a system of an engine or a piece of equipment (e.g., a component of the starting system), or a component of a piece of equipment.

In some embodiments, the engine 1000 has or is configured to operate in one or more conditions, such as one or more of a starting condition, a running condition, and a stopping condition. A starting condition may be a condition in which the engine 1000 requires energy from the electric starting system 1014 in order to start (e.g., in order to start rotating the crankshaft 1008). A starting condition may be a condition in which the engine 1000 is receiving energy from the electric starting system 1014. A starting condition may be a condition in which the engine 1000 the starter motor 1016 is coupled to and/or rotating the crankshaft 1008. A running condition may be a condition in which the engine 1000 does not require energy from the starting system 1014 in order to rotate the crankshaft 1008. A running condition may be a condition in which the starter motor is decoupled from the crankshaft 1008. A running condition may be a condition in which a charging system powered by the engine 1000 is charging the lithium-ion battery 1020. A running condition may be a condition in which the engine 1000 is engaged in a combustion process that allows the crankshaft 1008 to be rotated independent of energy from a remote system (e.g., from the electric starting system 1014). A stopping condition may be a condition in which a combustion process used to power the engine 1000 has been discontinued.

Conventionally, lithium-ion batteries use lithium cobalt oxide ($LiCoO_2$) or other metal oxides (e.g., $Mn_2O_4$, etc.) for the battery cathode. $LiCoO_2$ batteries are characterized by nominal cell voltages of approximately 3.6 volts, and maximum charging voltages of approximately 4.2 volts per cell. $LiCoO_2$ batteries may be damaged by overvoltages as low as 0.1 volts above the 4.2 volt maximum charging voltage. Typical three-cell and four-cell $LiCoO_2$ batteries would have nominal voltages of approximately 10.8 and 14.4 volts, respectively.

The lithium-ion battery 1020 may be provided with LFP battery chemistry. For example, the lithium-ion battery 1020 may have four LFP cells, with each cell having a nominal voltage of 3.2 volts, a maximum charging voltage of 3.6 volts, a discharge voltage threshold of approximately 2.0 volts, and an overcharge voltage threshold of approximately 4.0 volts. The four-cell lithium-ion battery 1020 may operate at a full pack nominal voltage of 12.8 volts, a full pack overcharge threshold of approximately 16.0 volts, and a full pack discharge voltage threshold of approximately 8.0 volts. With a nominal voltage of 12.8 volts, the lithium-ion battery 1020 becomes comparable in voltage to a typical six-cell lead-acid battery (which is typically rated at 12 volts). The lithium-ion battery 1020 using LFP battery chemistry may offer significant advantages over other battery chemistries, particularly in terms of power density, safety, number of uses, low self-discharge rate, etc. In some embodiments, due to the slow rate of capacity loss of LFP batteries, the lithium-ion battery 1020 may surpass an oxide-based lithium-ion battery in energy density over time. In some embodiments, the lithium-ion battery 1020 may be charged past its overcharge threshold without significant degradation in chemistry and/or structure; instead, the cells of the lithium-ion battery 1020 are able to absorb the heat generated by such energy transfer. Unlike oxide-based lithium-ion batteries, the lithium-ion battery 1020 generally has a constant discharge voltage close to the nominal voltage, allowing the battery to deliver virtually full power until complete discharge, while mitigating the need for voltage regulation circuitry.

Figure 4A:
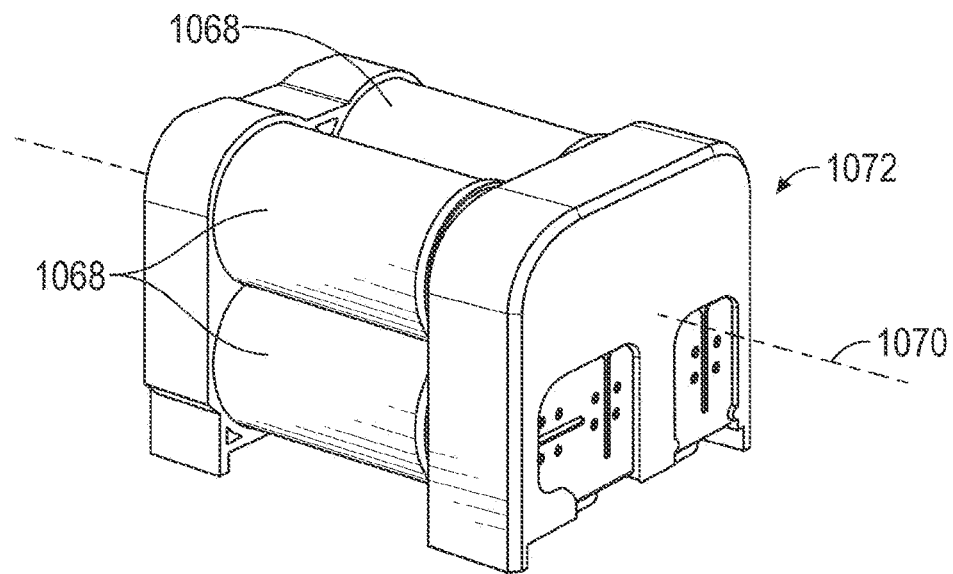
FIG. 4A is a perspective view of a lithium-ion battery pack, according to an exemplary embodiment of the invention.
Figure 4B:
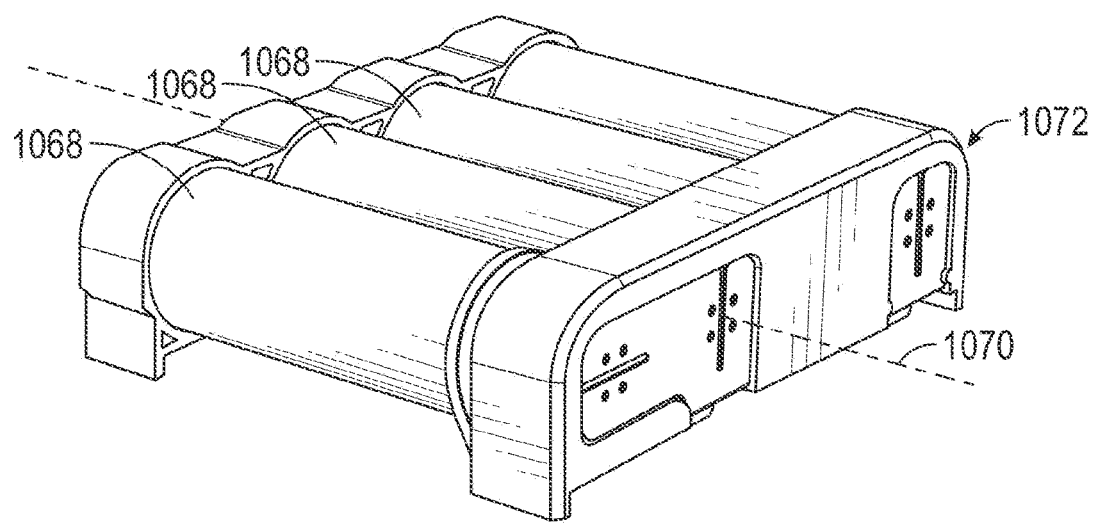
FIG. 4B is a perspective view of a lithium-ion battery pack, according to an exemplary embodiment of the invention.

As shown in FIGS. 3A, 3B, 4A, and 4B, in one embodiment, lithium-ion battery 1020 includes one or more lithium-ion cells 1068 electrically coupled together. As illustrated, four lithium-ion cells 1068 are used, though more or fewer may be used in different embodiments. Each lithium-ion cell 1068 is formed as an elongated body having a longitudinal axis (e.g., a cylindrical, cylinder, or cylindrical roll style lithium-ion cells). All four lithium-ion cells 1068 are oriented in the same direction, the cell axis 1070. The four lithium-ion cells 1068 are secured as a pack 1072 so that the entirety of the pack 1072 (including all four lithium-ion cells 1068) moves as a single integral unit. This prevents the four lithium-ion cells 1068 from moving independently from one another. Movement of the pack 1072 as a single unit helps to reduce failure modes for the lithium-ion battery 1020 related to vibration. The pack 1072 may include cells 1068 secured in various arrangements, such as a two-by-two arrangement as shown in FIG. 4A, or a four-by-one arrangement as shown in FIG. 4B.

A battery housing 1086 contains and supports the lithium-ion cells 1068. As illustrated, the housing 1086 is formed by two primary pieces, a top half or portion 1088 and a bottom half or portion 1090, though other constructions are possible. The housing 1086 has a top side 1092, a bottom side 1094, a front side 1096, a back side 1098, a left side 1100, and a right side 1102. In a preferred embodiment, the housing 1086 is a sealed enclosure that is configured to protect the electrochemical cells by preventing environmental contaminants (e.g., moisture, plant debris, salt, dust, etc.) from passing into the interior of the housing 1086. The housing 1086 provides a rugged structure that is able to withstand impact during operation of the equipment. The housing 1086 can be formed from a material that is resistant to liquid or vaporized fuel (e.g., polyethylene terephthalate or PET) to prevent fuel from passing into the interior of the housing 1086.

In some embodiments, the lithium-ion battery 1020 is configured for a low impedance. This improves the effectiveness of the lithium-ion battery 1020 in delivering the charge necessary to satisfy the load demanded, such as for starting outdoor power equipment. For example, the battery cells 1068 may be manufactured with multiple tabs for the electrodes, allowing electrons to move across shorter distances between tabs. The electrolyte material between the electrodes may be modified, such as by changing the salt concentration to make the electrolyte more conductive.

As compared to a typical lithium-ion battery, the LFP-based lithium-ion battery 1020 excludes (i.e., does not include) a battery management system including battery management circuitry. The battery management circuitry typically includes a processor and a memory device. The battery management circuitry typically implements one or more processes to protect the lithium-ion battery 1020. Frequently these protections includes preventing overcharging the battery cells and preventing excessive discharge of the battery cells. In different embodiments, battery management circuitry may include either or both of cell protection circuitry and charge control circuitry. Charge control circuitry may typically disconnect cells 1068 from charging circuitry once cells have reached a desired voltage. Charge control circuitry controls recharging of the cells up to their desired level and prevents overcharging the cells past an overcharge threshold. As an example, charge control circuitry will apply a constant current/constant voltage (CC/CV) charging scheme to the cells to bring the cells back up to the desired voltage (see, e.g., the charging scheme illustrated in FIG. 7). Cell protection circuitry typically prevents cells 1068 from discharging energy below a certain discharge voltage threshold. Cell protection circuitry also may prevent operation outside of a range of appropriate operating temperatures. Cell protection circuitry or charge control circuitry are typically provided to optimize performance of the lithium-ion battery, and to optimize the life of the lithium-ion battery. However, the combination of LFP chemistry with a 14 volt charging system can optimize the performance and life of the lithium-ion battery 1020 without incurring the expense of cell protection circuitry or charge control circuitry.

Figure 5A:
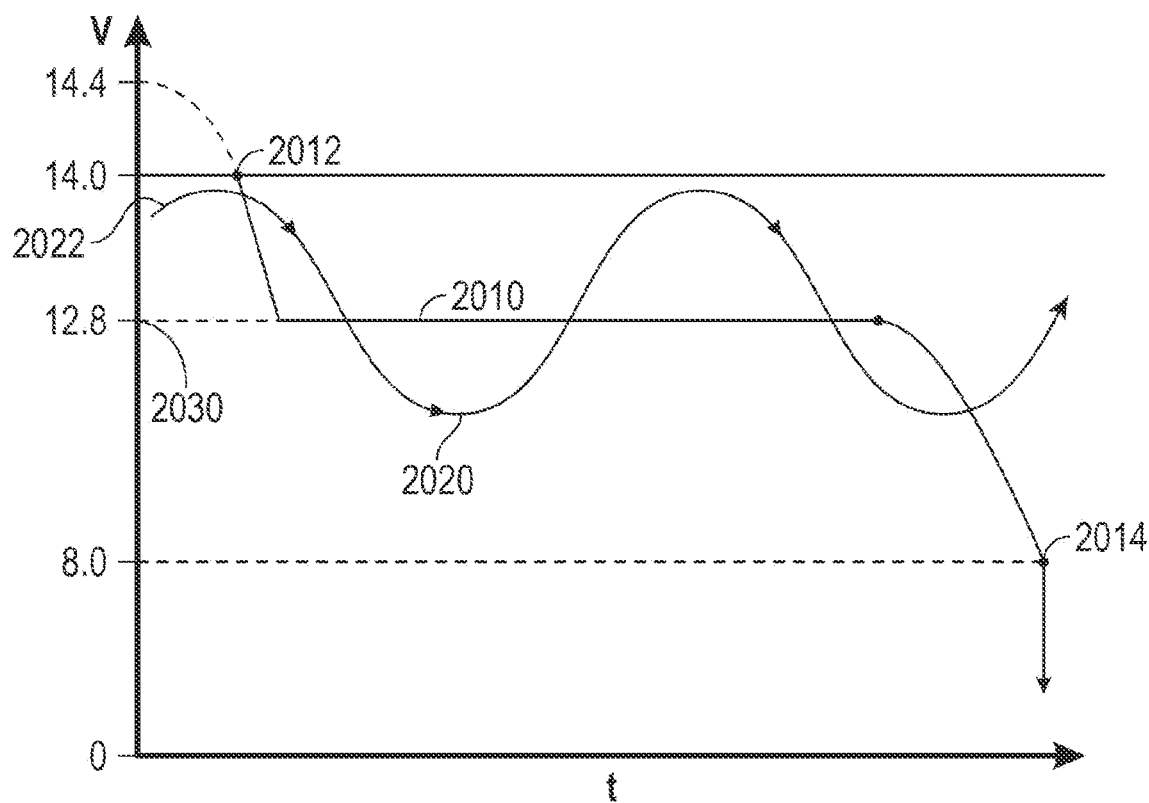
FIG. 5A is a chart of charging/discharging schemes for a four-cell lithium-ion battery, according to an exemplary embodiment of the invention.
Figure 5B:
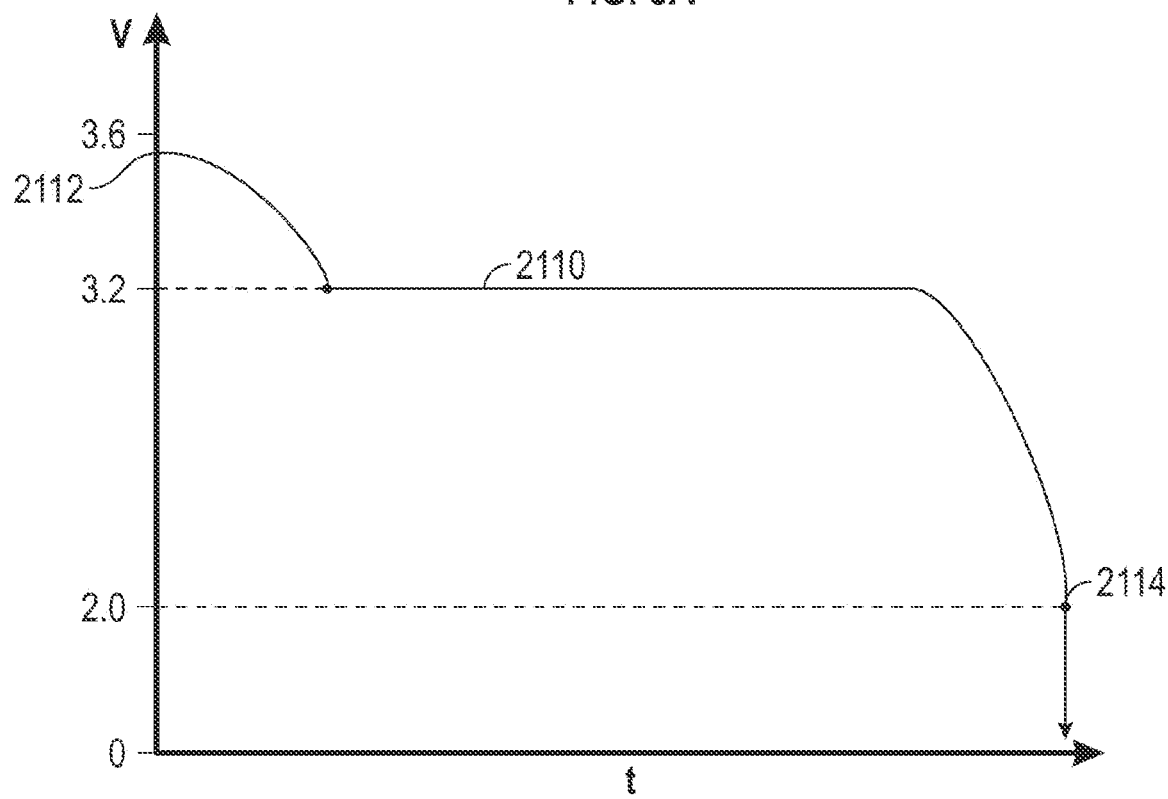
FIG. 5B a chart of charging/discharging schemes for one cell of a four-cell lithium-ion battery, according to an exemplary embodiment of the invention.
Figure 12:
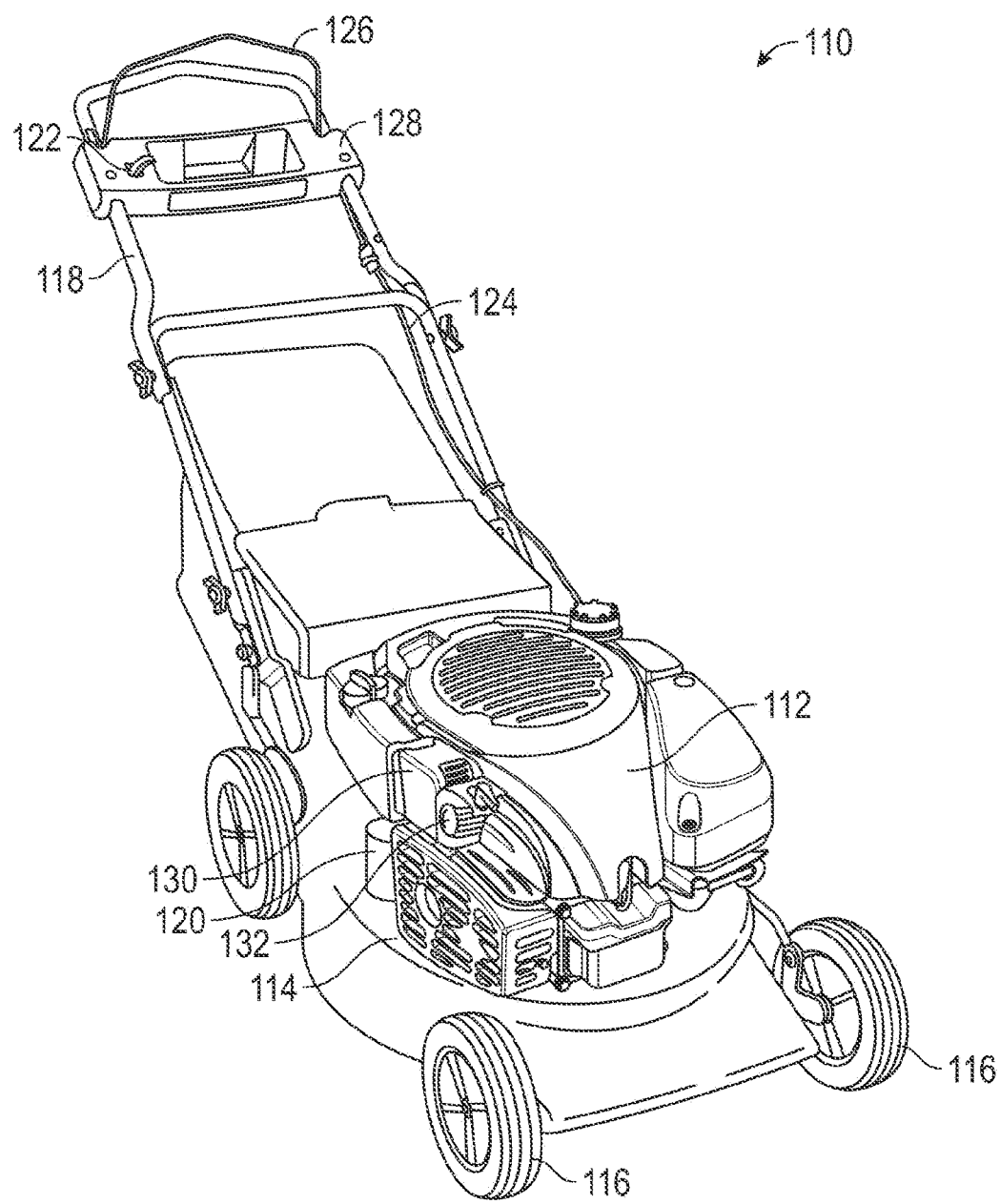
FIG. 12 is a perspective view of a lawn mower, according to an exemplary embodiment of the invention.

FIGS. 5A-5B illustrate charging behavior for a four cell LFP-based lithium-ion battery (e.g., lithium-ion battery 1020 shown in FIG. 1, etc.) and a single cell of the lithium-ion battery 1020 (e.g., cell 1068 shown in FIGS. 4A-4B, etc.). In FIG. 5A, curve 2010 is an example of the voltage for the lithium-ion battery 1020 from a charged state 2012 to a discharged state 2014. The lithium-ion battery 1020 initially has been charged (e.g., by outdoor power equipment such as a lawnmower as shown in FIG. 12, a pressure washer as shown in FIG. 14; or by a charging accessory such as charging accessory 624 shown in FIG. 13) such that it has a 14 volt full pack potential (3.5 volts/cell). Upon exposure to a load, such as outdoor power equipment being started, current is drawn from the lithium-ion battery 1020, and the lithium-ion battery 1020 may reach a nominal pack voltage 2030 of approximately 12.8 volts (3.2 volts/cell). If further energy is drawn from the lithium-ion battery 1020, the lithium-ion battery 1020 may reach a discharge voltage level 2014 of approximately 8 volts (2 volts/cell) or below. In FIG. 5B, curve 2110 illustrates a discharge profile for one single cell 1068 of the battery pack 1072 of the battery 1020 in accordance with one embodiment. The single cell 1068, having been initially charged such that it reaches 3.5 volts, is discharged to a nominal voltage of 3.2 volts, and may operate at the nominal voltage before enough current is drawn for the resulting voltage of the cell 1068 to be less than the minimum discharge threshold 2114 of approximately 2.0 volts.

Cycle 2020 illustrates an exemplary charge/discharge cycle for the lithium-ion battery 1020. The cycle 2020 may represent the charge/discharge behavior for the lithium-ion battery 1020 any number of cycles into the lifespan for the lithium-ion battery 1020. For example, the lithium-ion battery 1020 may have a lifespan of approximately several thousand charge/discharge cycles, and the cycle 2020 may represent any of such charge/discharge cycles. At position 2022, the lithium-ion battery 1020 is in a charged state. Upon exposure to a load, such as outdoor power equipment being started, the lithium-ion battery 1020 is discharged, and the resulting voltage may approximate or be less than the nominal pack voltage 2030. The lithium-ion battery 1020 may then be charged by a charging circuit (e.g., by an alternator driven by the outdoor power equipment, etc.) at a charging voltage (e.g., a charging voltage between 13.3 and 14 volts, a charging voltage less than a maximum full pack voltage, a charging voltage such that each cell of the battery is charged at less than a maximum cell voltage, etc.).

In some embodiments, the lithium-ion battery 1020 following a charge/discharge cycle corresponding to cycle 2020 thus generally retains a voltage close to the nominal pack voltage 2030, never being fully charged, overcharged, or overdrawn/fully discharged. For example, the lithium-ion battery 1020 may be a four-cell LFP battery, with a minimum/discharge voltage threshold of 8 volts, a nominal full pack voltage of 12.8 volts, a maximum full pack voltage of 14.4 volts, and a full pack overcharge threshold of 16 volts. The battery 1020 may be used with outdoor power equipment supplying charging voltage of 14 volts, such that the battery 1020 is never exposed to an overcharge voltage as the voltage of the charging system (14 volts) is less than the full pack overcharge threshold for the lithium-ion battery 1020 (16 volts). The battery 1020 may provide a brief pulse of energy (current) for starting the outdoor power equipment, and then immediately be charged by the outdoor power equipment while the outdoor power equipment is in operation. The lithium-ion battery 1020 may advantageously provide the high energy and/or current necessary to start the outdoor power equipment over a relatively short time frame (e.g., in a nearly instantaneous pulse), such that the total energy drawn from the lithium-ion battery 1020 is relatively low, and thus the lithium-ion battery 1020 is not significantly discharged.

Figure 6A:
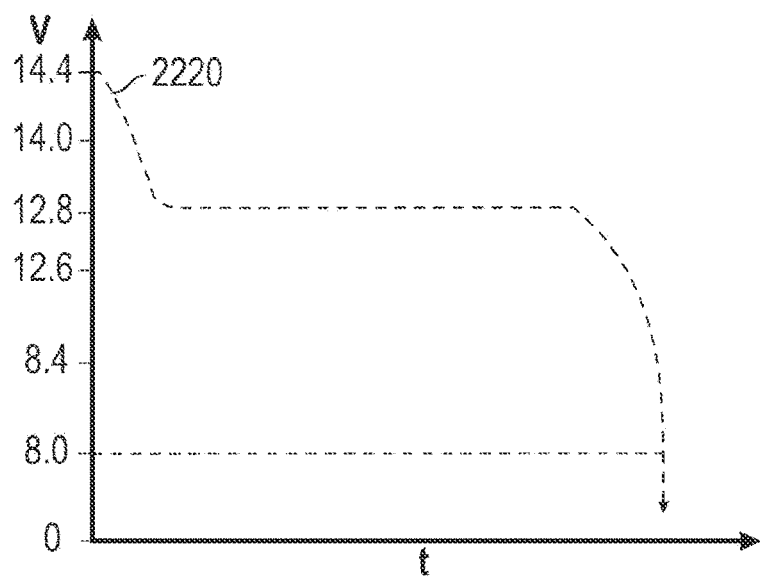
FIG. 6A is a chart illustrating charging/discharging schemes for a four-cell lithium-ion battery operated with a battery management system, according to an exemplary embodiment of the invention.
Figure 6B:
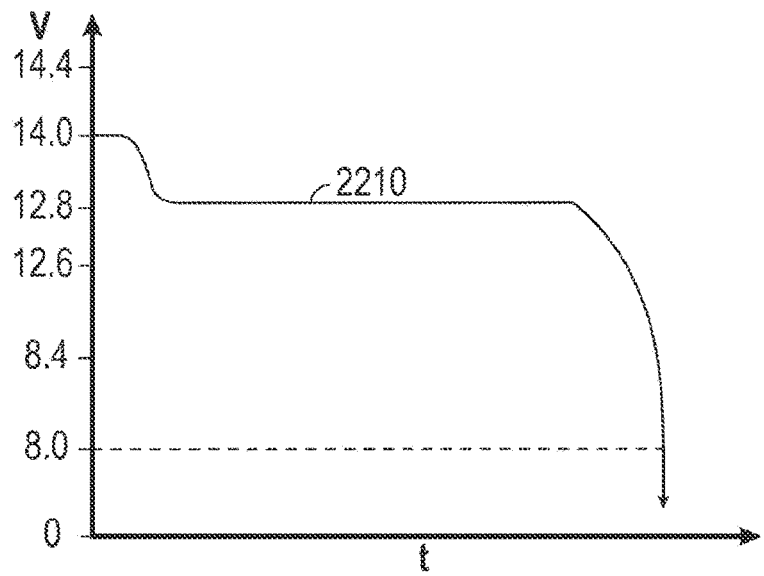
FIG. 6B is a chart illustrating charging/discharging schemes for a four-cell lithium-ion battery operated without a battery management system, according to an exemplary embodiment of the invention.

Referring to FIGS. 6A and 6B, a discharge profile 2210 (solid line) for the lithium-ion battery 1020 without a battery management system is shown, in comparison to a discharge profile 2220 (broken line) for a battery having a battery management system. In some embodiments, the discharge profile 2210 begins with the lithium-ion battery 1020 having a charged state voltage of 14.0 volts, as the lithium-ion battery 1020 is charged by a 14.0 volt power source e.g., outdoor power equipment, a charging station, etc.). The lithium-ion battery 1020 is discharged (e.g., in order to start outdoor power equipment) to a nominal voltage of 12.8 volts, and eventually may be discharged to below a minimum voltage threshold of 8.0 volts. The discharge profile 2220 begins at 14.4 volts, because a battery management system is used to manage the voltage and current in the battery being operated (in a CC/CV charging scheme, a battery could be charged to 14.4 volts). Although the lithium-ion battery 1020 may be operated according to a charging scheme that concedes the energy related to the voltage difference between 14.0 volts and 14.4 volts, the lithium-ion battery 1020 may be operated without a complex battery management scheme. Instead, the lithium-ion battery 1020 may follow a charging profile such as cycle 2020 shown in FIG. 5A, wherein the lithium-ion battery 1020 is able to provide the significant instantaneous energy output necessary for an electric start, and then is charged by another power source, such that the voltage of the lithium-ion battery 1020 remains close to the nominal voltage of 12.8 volts, rather than decreasing towards or below the minimum voltage threshold of approximately 8.0 volts. In some embodiments, discharge of the lithium-ion battery 1020 is terminated when the voltage of the lithium-ion battery 1020 is less than or equal to 8.0 volts (i.e. 2.0 volts/cell). At 8.0 volts, there is no capacity left in the battery; discharging after 8.0 volts will degrade the chemistry in the lithium-ion battery 1020. Discharge of the lithium-ion battery 1020 may be terminated in the 8.0-8.8 volt range (i.e. 2.0-2.2 volts/cell), in order to improve the cycle life of the lithium-ion battery 1020. In some embodiments, a simple algorithm may be used to determine if the lithium-ion battery 1020 is consistently cycling below 2.0 volts/cell, or if such behavior is temporary.

In some embodiments, a charging source (such as outdoor power equipment in operation) may charge the lithium-ion battery 1020 using an alternator. A regulator, such as a voltage regulator, may control the energy transfer from the alternator to the battery, such as by decreasing the current output of the alternator when the battery is charged, and increasing the current output of the system when the application uses battery power. In some embodiments, the voltage regulator limits the voltage supplied to 14.0 volts. In some embodiments, a regulator limits the number of current pulses passing to/from the lithium-ion battery 1020. The regulator may be configured to only limit the number of current pulses, rather than the magnitude of the current passing to/from the lithium-ion battery 1020 (i.e., the LFP-based lithium-ion battery 1020 can tolerate high current pulses). The regulator may be configured to limit the voltage to 14.0 volts while limiting the number of current pulses. Regulating the number of current pulses may help ensure that the lithium-ion battery 1020 operates in a preferential charge/discharge cycle, such as the cycle illustrated by cycle 2020 shown in FIG. 5A.

In some embodiments, the lithium-ion battery 1020 may be configured to have a certain number of cells based on a ratio relative to a property of the charging source. For example, the charging source may provide charge at a first voltage, and the number of cells may be configured such that the maximum voltage of the full cell pack is as close as possible to the first voltage, without the first voltage being greater than an overcharge voltage for the full cell pack. The ratio may also be configured such that a nominal operating voltage of the lithium-ion battery 1020 is no greater than the first voltage.

Figure 7:
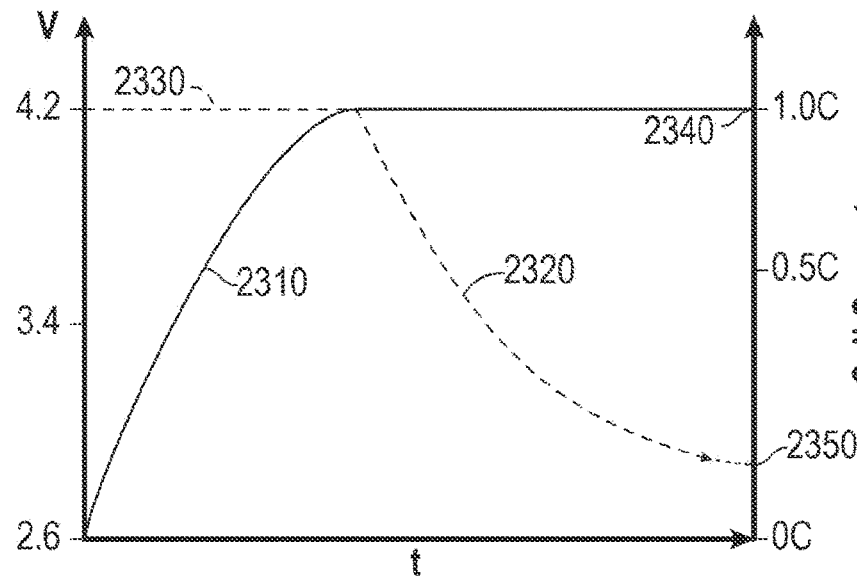
FIG. 7 is a chart illustrating a constant current/constant voltage charging scheme.

Referring to FIG. 7, a CC/CV charging scheme for an oxide-based lithium-ion battery is illustrated. Curve 2310 (solid line) illustrates the voltage as a function of time, while curve 2320 (broken line) illustrates the current as a function of time. During the constant current phase, the battery is charged at 1.0 C (i.e., at the capacity rating charge rate for the battery), while the voltage is increased (e.g., increased from 2.6 volts to the maximum voltage 2330 of 4.2 volts). Once the maximum voltage 2330 is reached, the voltage is held constant during the constant voltage phase, while the current is decreased to a minimum current 2350 (e.g., the minimum current may be a fraction of the capacity rating charge rate 2340, including a fraction between 0 percent and 10 percent, between 1 percent and 5 percent, etc.).

Figure 8:
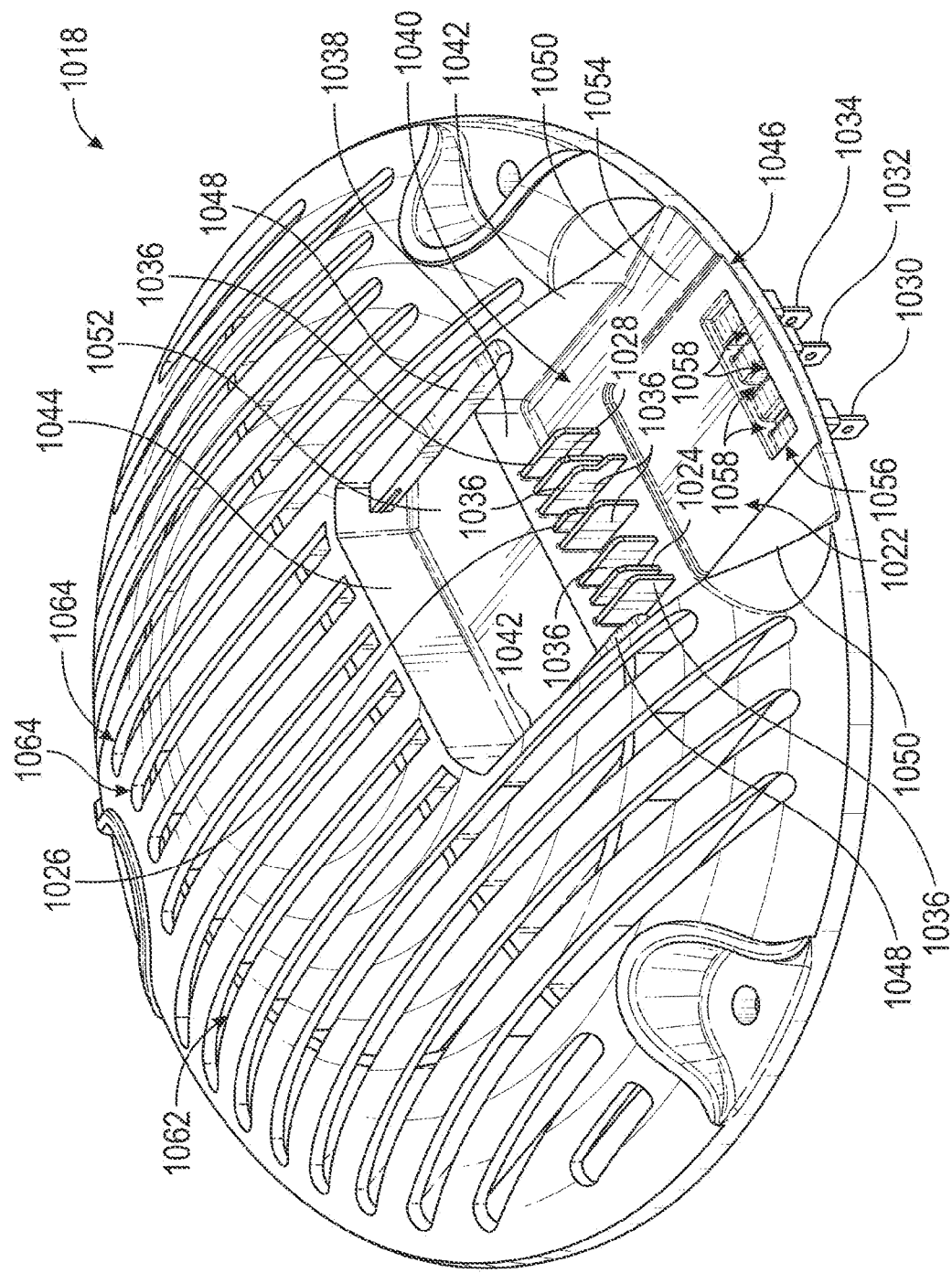
FIG. 8 is a perspective view of a battery receiver for receiving a lithium-ion battery, according to an exemplary embodiment of the invention.

Referring to FIG. 8, the battery receiver 1018 is illustrated according to an exemplary embodiment. The battery receiver 1018 includes a receptacle (port, socket, pocket, etc.) configured to receive the lithium-ion battery 1020. The receptacle includes three male terminals 1024, 1026, and 1028 configured to couple with corresponding female terminals of the lithium-ion battery 1020. The receptacle 1022 includes a second set of three male terminals 1030, 1032, and 1034 configured to be coupled to corresponding terminals of a wiring harness, which is electrically coupled to the starter motor and any other electrical components of the engine 1000 and/or the piece of outdoor power equipment including the engine that are powered by or send signals (data, information, etc.) to and/or from the lithium-ion battery 1020. Each of the terminals 1024, 1026, and 1028 is electrically coupled to a corresponding one of the terminals 1030, 1032, and 1034. Two pairs of the terminals (e.g., terminal pair 1024 and 1030 and terminal pair 1028 and 1034) are used to complete an electrical circuit between the starter motor 1016 and the lithium-ion battery 1020 (e.g., as a positive terminal pair and a ground terminal pair). These two pairs of terminals may be referred to as voltage output terminals. The third pair of the terminals (e.g., terminal pair 1026 and 1032) is used to transmit a signal (e.g., an enable signal as described herein) to and/or from the lithium-ion battery 1020. This third pair of terminals may be referred to as data terminals or as the enable terminals. A guide 1036

(wall, protrusion, etc.) is positioned on either side of each of the terminals 1024, 1026, and 1028. Each guide 1036 is received by a corresponding aperture in the lithium-ion battery 1020 and helps to guide the terminals 1024, 1026, and 1028 into the corresponding female terminals of the lithium-ion battery 1020. The guides 1036 extend outward from a wall 1038 of the receptacle 1022 to a distance greater than that of the terminals 1024, 1026, and 1028. The enable terminal 1026 extends to a distance less than the voltage output terminals 1024 and 1028. This helps to ensure that lithium-ion battery 1020 is not able to power the starter motor 1016 except when the lithium-ion battery 1020 is properly secured (fully inserted, fully seated, properly inserted, properly seated, properly installed) in the receptacle 1022. Unless the lithium-ion battery 1020 is properly secured, the lithium-ion battery 1020 cannot provide power to the starter motor 1016, even with the voltage output terminals 1024 and 1028 electrically connected to corresponding voltage output terminals of the lithium-ion battery 1020. The lack of connection to the enable terminal 1026 prevents an enable signal needed for the lithium-ion battery 1020 to provide power to the starter motor 1016 from reaching the lithium-ion battery 1020. In other embodiments, more/fewer terminals are used as appropriate.

Figure 9:
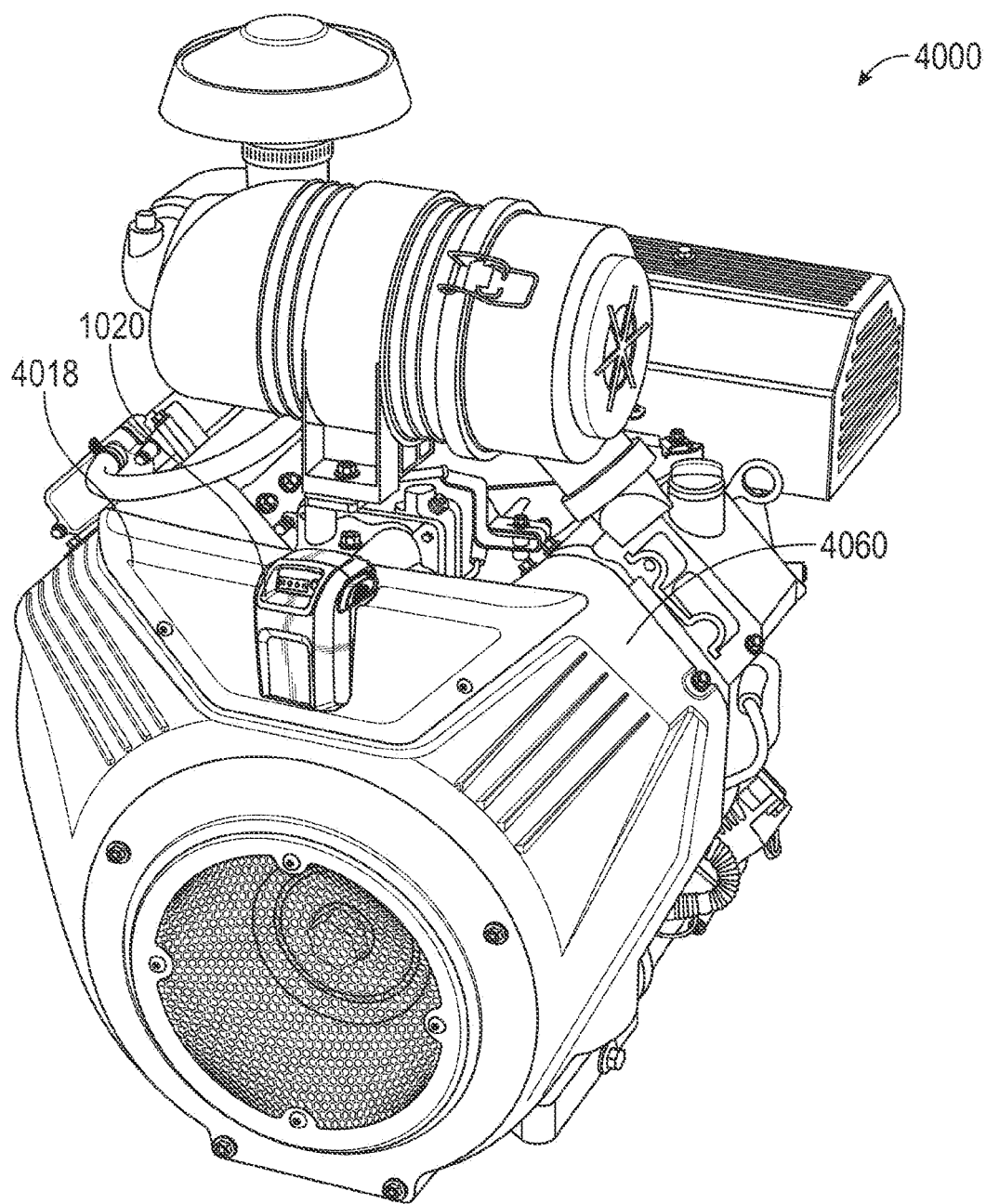
FIG. 9 is a perspective view of an internal combustion engine including an electric starting system powered by a lithium-ion battery, according to an exemplary embodiment of the invention.

Referring to FIG. 9, a V-twin two-cylinder internal combustion engine 4000 is illustrated according to an exemplary embodiment. The lithium-ion battery 1020 is selectively attached to a battery receiver 4018. As illustrated, the battery receiver 4018 is a portion of the engine housing 4060. In other embodiments, the battery receiver is not a component of the engine itself and is instead mounted to the outdoor power equipment at a location remote from (separate from, spaced apart from) the engine 4000. An electrical connection (e.g., a wiring harness) is used to electrically connect such a battery receiver to the starter motor 1016 and any other required electrical components of the outdoor power equipment. For example, for a riding tractor, riding lawn-mower, snow thrower, or zero-turn mower, the battery receiver may be a component of a dashboard or other user-control panel.

Figure 10:
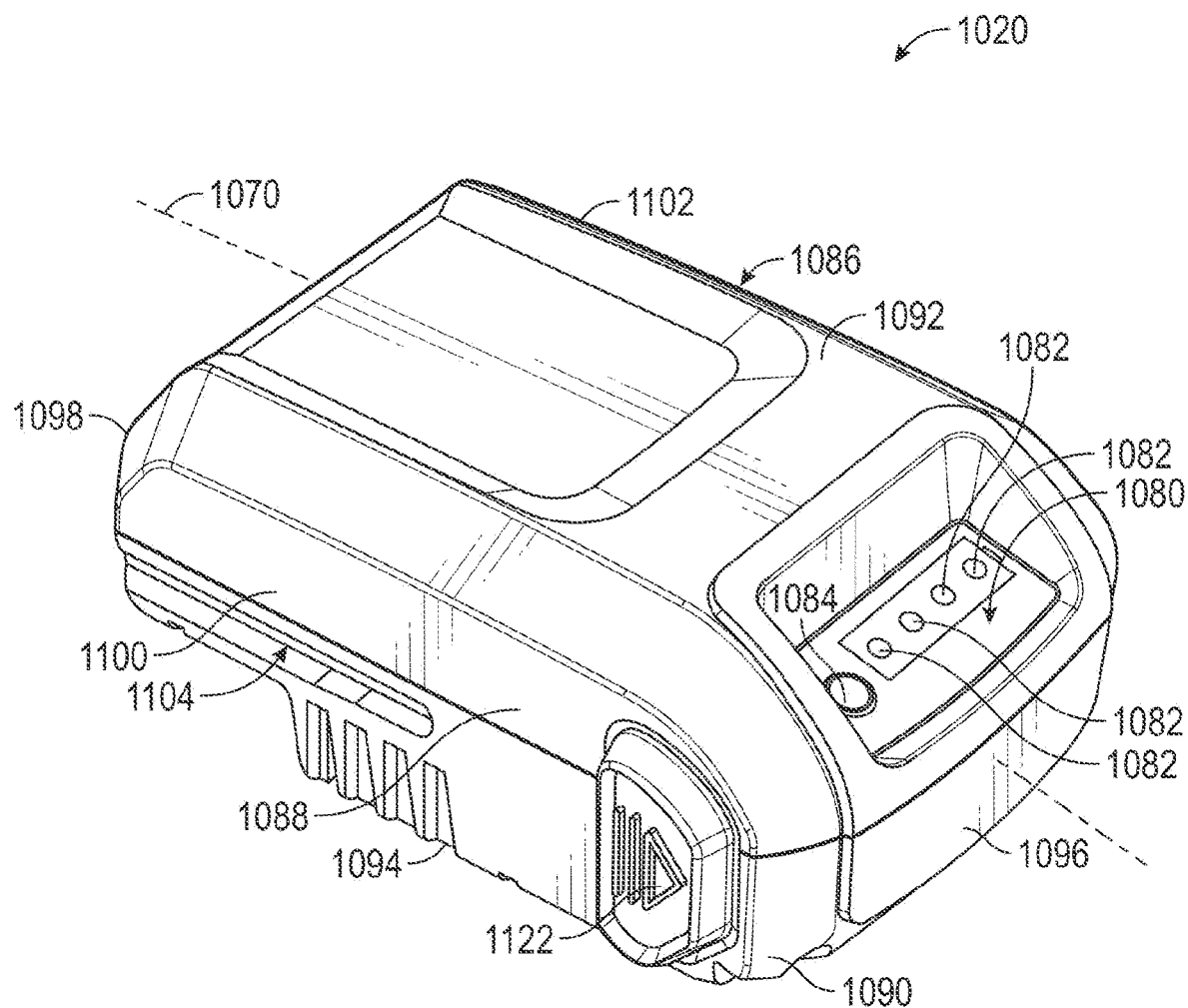
FIG. 10 is a perspective view of a lithium-ion battery for use with an electric starting system of an internal combustion engine, according to an exemplary embodiment of the invention.

Referring to FIG. 10, the lithium-ion battery 1020 is illustrated according to an exemplary embodiment. The lithium-ion battery 1020 is not equivalent to a lithium-ion battery for use with cordless power tools (e.g., a drill). For example, the lithium-ion battery 1020 may include fewer lithium-ion battery cells than a power tool battery and is intended for less frequent cycling at lower run times than a power tool battery (e.g., used to start an engine, not used to power frequent running of a drill motor for relatively long durations). The operation of the lithium-ion battery 1020 requires an output of relatively high current (e.g., 200 Amps) over a relatively short discharge time (e.g., 10 milliseconds). In some embodiments, the lithium-ion battery 1020 benefits from the high power density of LFP chemistry. A lithium-ion battery for use with a power tool or portable computing device (e.g., a laptop computer) provides an output of a relatively low current over a relatively long discharge time. Additionally, a power tool lithium-ion battery is "always on" so that it is always able to provide power to the tool. As such, a lithium ion battery in a power tool/laptop-type application requires a battery management system.

Figure 11:
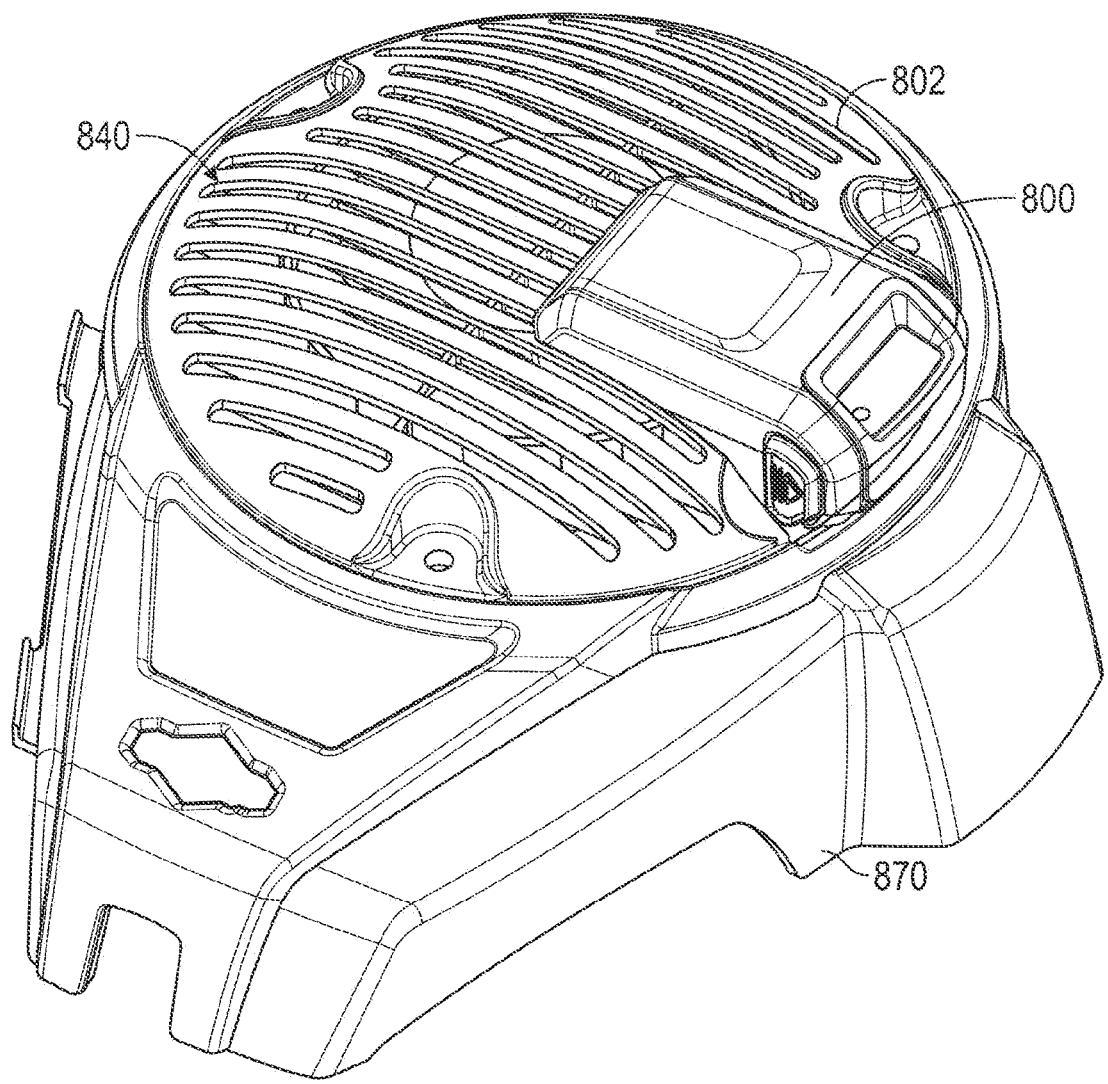
FIG. 11 is a perspective view from above of a blower housing according to an exemplary embodiment of the invention.

Referring to FIG. 11, a blower housing 870 (e.g., engine housing) is shown according to an exemplary embodiment. The blower housing 870 integrates a battery receiver 802. The battery receiver 802 includes a multitude of openings shown as slots 840 to allow air to pass through the battery receiver 802 while limiting the ability for debris such as grass clippings to pass through the battery receiver 802. In some embodiments, the thermal stability of LFP battery chemistry makes a battery 800 well suited for operation in conditions with high temperatures and/or major temperature fluctuations, such as being placed in close proximity to a running engine (e.g., on the blower housing 870).

Referring to FIG. 12, outdoor power equipment, in the form of a lawn mower 110, includes an internal combustion engine 112 coupled to a rotary tool, such as the blade in a deck 114 of the lawn mower 110, an auger, a saw, tines, a drill, a pump, or other rotary tools. In some embodiments, the lawn mower 110 further includes wheels 116 and a rearward extending handle 118 designed to be pushed by an operator walking behind the lawn mower 110. In other contemplated embodiments, the outdoor power equipment may be in the form of a rotary tiller, a pressure washer, a snow thrower, a lawn tractor or riding mower, an edger, a portable generator, or other equipment, with a corresponding powered tool, such as tines, a pump, an auger and impeller, an alternator, a drive train, or other tools.

Still referring to FIG. 12, the lawn mower 110 includes a starting system. According to an exemplary embodiment, the starter system includes an electric motor 120 that is selectively coupled to the engine 112 such that that the electric motor 120 is configured to rotate the crankshaft of the engine 112 to start the engine 112, and is then configured to disengage once the engine 112 is running. In some embodiments, the electric motor 120 is fastened to the engine 112, such as being mounted on top of or to a side of the engine 112. Gearing (e.g., gear reduction, transmission) may extend between the electric motor 120 and the crankshaft of the engine 112, or the electric motor 120 may be connected directly to the crankshaft of the engine 112.

Figure 13:
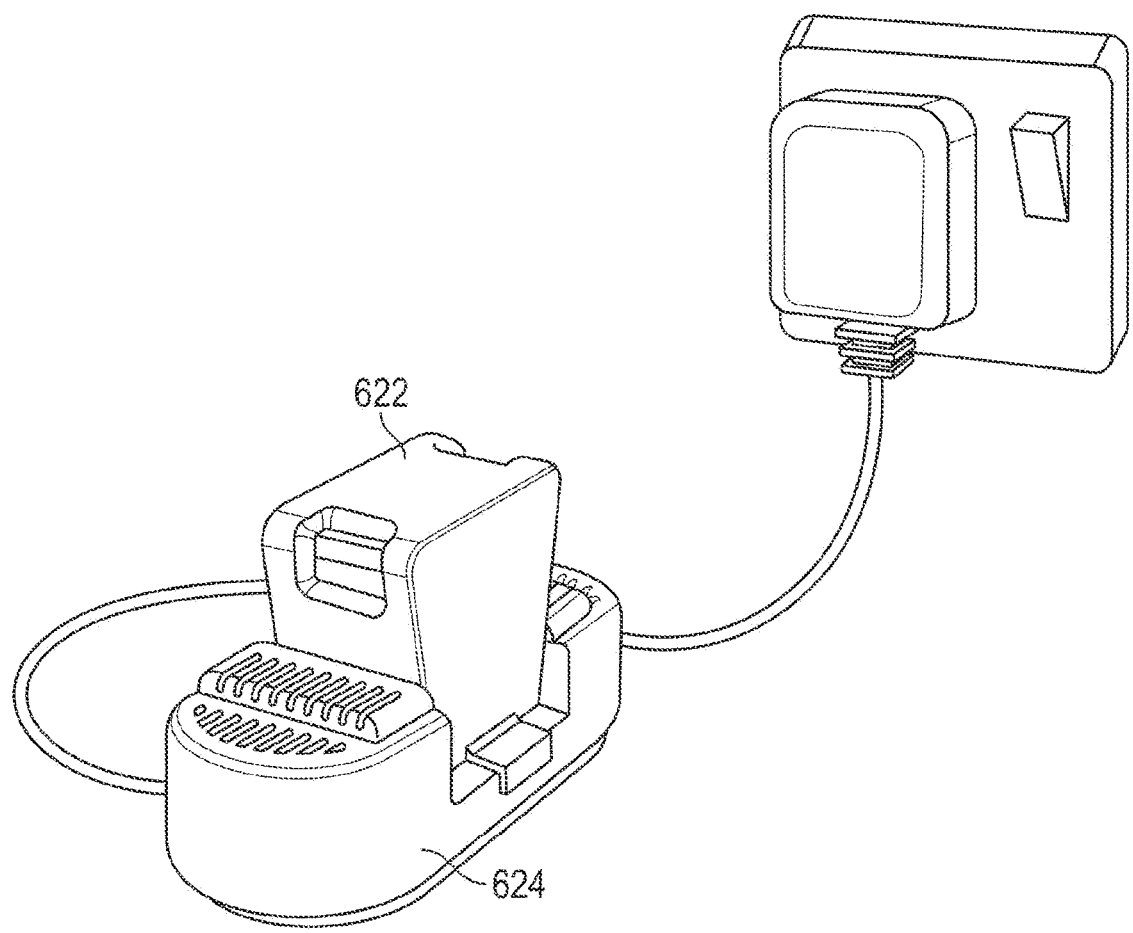
FIG. 13 is a perspective view of a charging accessory, according to an exemplary embodiment of the invention.
Figure 14:
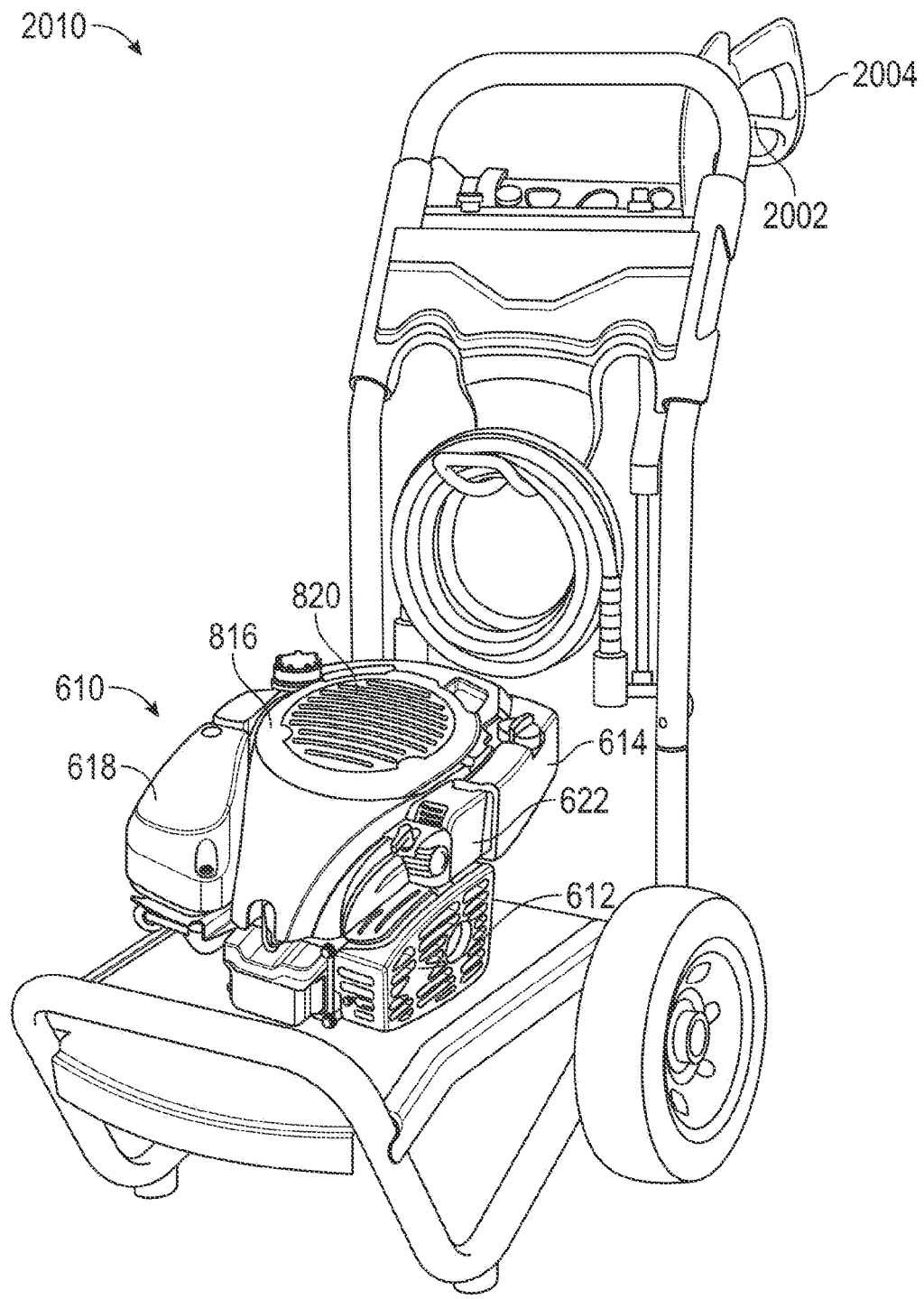
FIG. 14 is a perspective view of a pressure washer, according to an exemplary embodiment of the invention.

Referring to FIG. 13, a lithium-ion battery 622 is charged using a charging accessory 624. The charging accessory 624 may be configured to apply a voltage potential across the battery 622 such that the battery 622 is never exposed to an overvoltage. The charging accessory 624 may be configured to apply a limited number of brief current pulses to charge the battery 622.

Referring to FIG. 14, a pressure washer system 1910 includes an internal combustion engine 610. To start the engine 610, an operator may press a button. In other contemplated embodiments, an engine of a portable generator may use a similar starting system and includes the battery 622. Power provided by the generator may be used to charge the battery 622 of the starter system.

Figure 15:
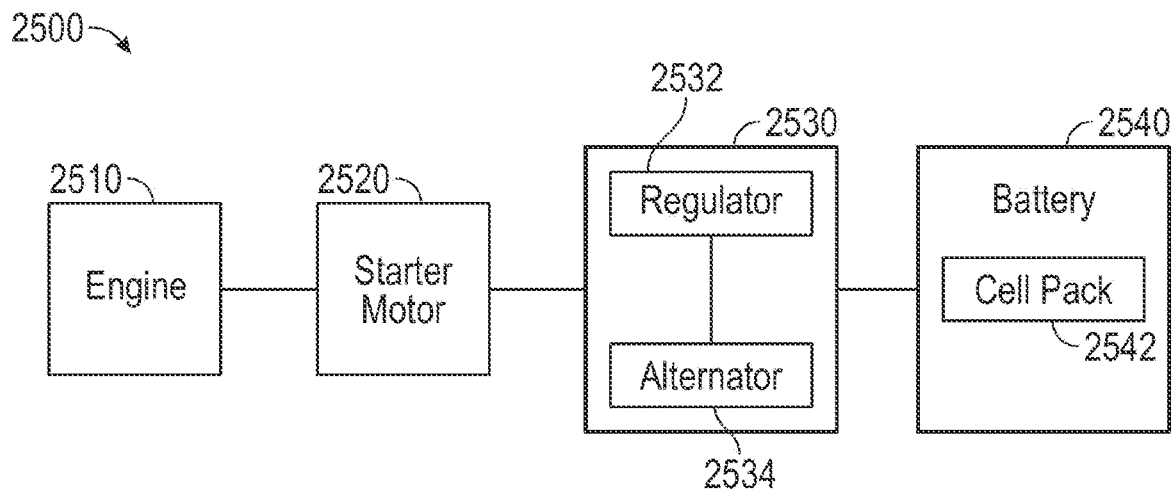
FIG. 15 is a block diagram of a system operating with an engine and a lithium-ion battery, according to an exemplary embodiment.

Referring to FIG. 15, a system 2500 operating with an LFP-based lithium-ion battery 2540 according to an exemplary embodiment is shown. The battery 2540 includes a cell pack 2542 containing at least one LFP battery cell. The system 2500 includes an engine 2510 (e.g., an internal combustion engine used to power outdoor power equipment, etc.), and a starter motor 2520 for starting the engine 2510, the starter motor 2520 to be driven by energy from the battery 2540. The system 2500 also includes a charging system 2530 which intermediates energy transfer between the engine 2510, the starter motor 2520, and the lithium-ion battery 2540. As illustrated in FIG. 15, the charging system 2530 includes a regulator 2532 and an alternator 2534. In other embodiments, other types of charging systems may be used. For example, an ignition coil waste spark charging system may be used in which waste sparks from the ignition coil are harvested to provide charging energy. In other contemplated embodiments, various components may be used to intermediate energy transfer between the lithium ion battery 2540 and the starter motor 2520/engine 2510. The system 2500 excludes a battery management system (e.g., battery management system 2642 shown in FIG. 16, etc.). The engine 2510 may charge the lithium-ion battery 2540 using the alternator 2534. The regulator 2532 (e.g., a voltage regulator) may control the energy transfer from the alternator 2534 to the lithium-ion battery 2540, such as by decreasing the current output of the alternator 2534 when the lithium-ion battery 2540 is charged, and increasing the current output through the charging system 2530 when the engine 2510 uses battery power. In some embodiments, the regulator 2532 limits the voltage supplied to 14.0 volts. In some embodiments, the regulator 2532 limits the number of current pulses passing to/from the battery 2540. The regulator 2532 may be configured to only limit the number of current pulses, rather than the magnitude of the current passing to/from the battery 2540 (i.e., the lithium-ion battery 2540 can tolerate high current pulses). The regulator 2532 may be configured to limit the voltage to 14.0 volts while limiting the number of current pulses. Regulating the number of current pulses may help ensure that the lithium-ion battery 2540 operates in a preferential charge/discharge cycle, such as the cycle illustrated by cycle 2020 shown in FIG. 5A. In some embodiments, a limiting system includes the regulator 2532 and/or the alternator 2534.

Figure 16:
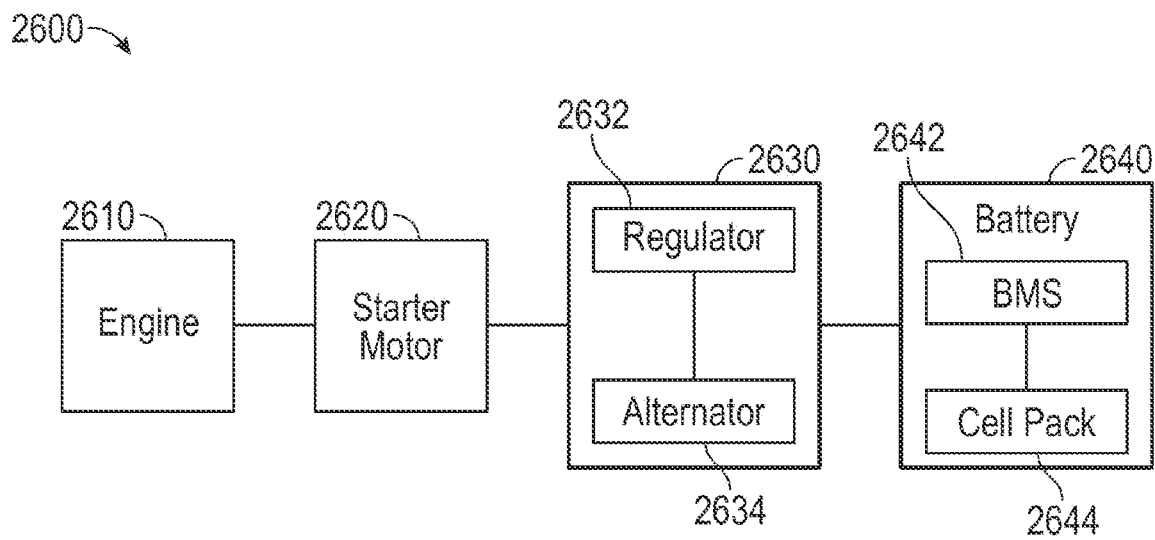
FIG. 16 is a block diagram of a conventional system operating with an engine, a lithium-ion battery, and a battery management system.

Referring to FIG. 16, a conventional system 2600 for operating an engine 2610 (e.g., an internal combustion engine used to power outdoor power equipment) and a battery 2640 (e.g., an $LiCoO_2$ battery) is shown. The system 2600 includes a charging system 2620 including a regulator 2622 and an alternator 2624. The battery includes a cell pack 2644 including at least one battery cell. The battery 2640 includes a battery management system (BMS) 2642. The battery management system 2642 may include at least one of cell protection circuitry and charge control circuitry. The battery management system 2642 thus applies complex circuitry for managing the charge state and voltage applied to the battery 2640, and particularly, manages the charge state and voltage applied to specific cells in the cell pack 2644 of the battery 2640. For example, the battery management system 2642 may be configured to charge the battery 2640 according to a CC/CV scheme. As illustrated in FIG. 16, a conventional system 2600 provides the battery management system 2642 as being integral with the battery 2640. In other cases, battery management features, such as cell protection circuitry and charge control circuitry, may be provided remote from the battery 2640.

In various alternative embodiments, a lithium-ion battery using LFP battery chemistry (e.g., the lithium-ion battery 1020 shown in FIG. 1, etc.) is not removable by hand. Instead, the lithium-ion battery 1020 may be fixed to a receiver or other component of outdoor power equipment. Additionally, the fixed lithium-ion battery 1020 may provide significant advantages over existing fixed lead-acid batteries, because the fixed lithium-ion battery 1020 has a lower self-discharge rate and may be used for several thousand cycles.

In various alternative embodiments, an engine (e.g., engine 1000 shown in FIG. 1, etc.) may include a limiting system for limiting an output to a lithium-ion battery (e.g., lithium-ion battery 1020 shown in FIG. 1, etc.). The limiting system may limit an output to the lithium-ion battery 1020. The output may include at least one of a current and a voltage. The limiting system may be configured to limit the current and/or the voltage to a value less than a maximum value. For example, the limiting system may limit the voltage to a value less than a maximum cell voltage of the lithium-ion battery 1020; the limiting system may limit the current to a value less than a maximum cell current of the lithium-ion battery 1020. In some embodiments, the engine 1000 includes a voltage regulator (e.g., voltage regulator 2532 shown in FIG. 15, etc.). The voltage regulator may be configured to limit the voltage. In some embodiments, the engine 1000 includes an alternator (e.g., alternator 2534 shown in FIG. 15, etc.). The alternator may be configured to limit the current and/or the voltage by limiting an overall magnitude of the output. For example, the alternator may include a stator including stator windings, and the design of the stator windings may be configured in order to limit the current and/or the voltage outputted to the lithium-ion battery 1020 (e.g., by modifying the number of turns of the windings, by modifying the diameter of the wire used for the windings, etc.). In some embodiments, a module independent from the alternator 2534 or voltage regulator 2532 (e.g., an independent module in the battery housing of the battery 2540, etc.) may be configured to limit the current and/or voltage.

In various alternative embodiments, the limiting system includes a switching system. The switching system is configured to disconnect a connection between a charging system (e.g., charging system 2530 shown in FIG. 15, etc.) and the lithium-ion battery 1020 based on at least one of the current and the voltage. For example, the switching system may disconnect a connection between the charging system 2530 and the lithium-ion battery 1020 if the voltage outputted by the charging system 2530 is greater than the overcharge voltage of the lithium-ion battery 1020.

In various alternative embodiments, the limiting system includes a switching circuit. The switching circuit is configured to modify the output using pulse width modulation. For example, the output may have a voltage of 36 volts, and the switching circuit may pulse the output in a 1 millisecond "on" segment, followed by a 2 millisecond "off" segment, such that the effective voltage of the output is 12 volts.

In various alternative embodiments, the limiting system includes a filtering circuit. For example, the filtering circuit may be an LC circuit including an inductor and a capacitor, and the LC circuit may filter the output, such as by smoothing peaks of the waveform of the output. In various embodiments, the limiting system includes a zener diode circuit or a metal oxide varistor circuit configured to clamp the current and/or the voltage below a maximum value.

This application is related to commonly owned U.S. patent application Ser. No. 14/309,602, published as U.S. Patent Publication No. 2014/0299089, which is incorporated herein by reference in its entirety.

The construction and arrangement of the apparatus, systems, and methods as shown in the various exemplary embodiments are illustrative only. Although only a few embodiments have been described in detail in this disclosure, many modifications are possible (e.g., variations in size, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. An engine comprising:
   at least one piston;
   a rotatable crankshaft coupled to the at least one piston;
   a starter motor configured to selectively initiate rotation of the crankshaft;
   a lithium-ion battery in electrical communication with the starter motor, the lithium-ion battery having at least one iron phosphate cell; and
   a charging system configured to be powered by motion of at least one component of the engine;
   wherein the charging system is configured to continuously apply a voltage potential to the at least one cell while the engine is in a running condition.

2. The engine of claim 1, wherein the lithium-ion battery comprises at least three cells.

3. The engine of claim 1, wherein the lithium-ion battery does not include battery management circuitry.

4. The engine of claim 1, wherein no cell protection circuitry is provided between the charging system and the lithium-ion battery.

5. The engine of claim 1, wherein no charge control circuitry is provided between the charging system and the lithium-ion battery.

6. An engine comprising:
   at least one piston;
   a rotatable crankshaft coupled to the at least one piston;
   a starter motor configured to selectively initiate rotation of the crankshaft;
   a lithium-ion battery in electrical communication with the starter motor, the lithium-ion battery having lithium iron phosphate cells; and
   a charging system configured to be powered by the engine;
   wherein the charging system is electrically coupled to the lithium-ion battery and configured to charge the lithium-ion battery;
   wherein no battery management circuitry is provided between the charging system and the lithium-ion battery.

7. The engine of claim 6, wherein the charging system includes an alternator.

8. The engine of claim 6, wherein no cell protection circuitry is provided between the charging system and the lithium-ion battery.

9. The engine of claim 6, wherein no charge control circuitry is provided between the charging system and the lithium-ion battery.

10. The engine of claim 6, further comprising a limiting system configured to limit an output provided to the lithium-ion battery, wherein the output comprises a current and a voltage.

11. The engine of claim 10, wherein the limiting system comprises a switching system, wherein the switching system is configured to disconnect a connection between the charging system and the lithium-ion battery based on at least one of the current and the voltage.

12. The engine of claim 10, wherein the limiting system comprises a switching circuit, wherein the switching circuit is configured to modify the output using pulse width modification.

13. The engine of claim 10, wherein the limiting system comprises a filtering circuit configured to modify a waveform of the output.

14. The engine of claim 10, wherein the limiting system comprises a zener diode or a metal oxide varistor configured to clamp the at least one of the voltage and the current.

* * * * *